US009779045B2

(12) United States Patent
Nishida et al.

(10) Patent No.: US 9,779,045 B2
(45) Date of Patent: Oct. 3, 2017

(54) ELECTRONIC CONTROLLER TO BE CONNECTED TO PROGRAM TOOL

(71) Applicant: Mitsubishi Electric Corporation, Chiyoda-ku, Tokyo (JP)

(72) Inventors: Mitsunori Nishida, Chiyoda-ku (JP); Yuki Iwagami, Chiyoda-ku (JP); Akihiro Ishii, Chiyoda-ku (JP); Osamu Nishizawa, Chiyoda-ku (JP); Manabu Yamashita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 748 days.

(21) Appl. No.: 14/247,957

(22) Filed: Apr. 8, 2014

(65) Prior Publication Data

US 2015/0120974 A1 Apr. 30, 2015

(30) Foreign Application Priority Data

Oct. 31, 2013 (JP) .................................. 2013-226399

(51) Int. Cl.
*G06F 13/00* (2006.01)
*G06F 13/20* (2006.01)
(Continued)

(52) U.S. Cl.
CPC ........ *G06F 13/362* (2013.01); *G06F 12/0246* (2013.01); *G06F 13/4295* (2013.01)

(58) Field of Classification Search
USPC ......... 710/104, 110, 300–304, 313; 713/1–2, 713/340; 700/83; 123/479; 340/693.4
See application file for complete search history.

(56) References Cited

U.S. PATENT DOCUMENTS 5,530,643 A * 6/1996 Hodorowski ...... G05B 19/0421
700/83
5,758,098 A * 5/1998 Townsley ............ G06F 13/4291
710/110

(Continued)

FOREIGN PATENT DOCUMENTS

| JP | 10-149282 A | 6/1998 |
| JP | 2005-297653 A | 10/2005 |
| JP | 2006-331185 A | 12/2006 |

*Primary Examiner* — Farley Abad
*Assistant Examiner* — Henry Yu
(74) *Attorney, Agent, or Firm* — Sughrue Mion, PLLC; Richard C. Turner

(57) ABSTRACT

A first external tool (10A) serially connected to an electronic controller (20A) through a pair of communication lines (LANH, LANN) applies a high voltage (Vaa) higher than a normal control voltage (Vcc) to the communication line (LANH) when a program is written. The electronic controller (20A) recognizes connection of the first external tool (10A) by a comparison circuit (212A) for monitoring a received voltage and a write-mode determination circuit (218A), initializes a microprocessor (200), and receives and stores an total control program (TCPRG) in a program memory (204A) based on a content of a boot program memory (201). During an operation of the electronic controller (20A), the external tool (10A) is removed and the high voltage (Vaa) is not applied to the communication line (LANH). Therefore, the electronic control apparatus is not erroneously placed in the write mode.

16 Claims, 12 Drawing Sheets

(51) Int. Cl.
*G06F 9/00* (2006.01)
*G06F 1/00* (2006.01)
*G06F 13/362* (2006.01)
*G06F 12/02* (2006.01)
*G06F 13/42* (2006.01)

(56) References Cited

U.S. PATENT DOCUMENTS

| | | | | |
|---|---|---|---|---|
| 6,108,598 | A * | 8/2000 | Sumitani | F02D 41/2487 123/479 |
| 6,438,462 | B1 * | 8/2002 | Hanf | G06F 1/3203 340/693.4 |
| 7,315,940 | B1 * | 1/2008 | Audette | G06F 11/1417 713/1 |
| 8,161,224 | B2 * | 4/2012 | Laurencin | G06F 13/4027 710/313 |
| 2002/0147939 | A1 * | 10/2002 | Wenzel | G06F 11/3648 714/30 |

* cited by examiner

FIG. 11

| SELECTED STAGE NUMBER Ji SET FOR EACH DATA i | DAT1 | DAT2 | DAT3 | DAT4 | DAT5 | DAT6 | DAT7 | DAT8 |
|---|---|---|---|---|---|---|---|---|
| | \multicolumn{8}{c}{SMALLEST VALUE Ai OF INITIAL SETTING DATA} |
| | A1 | A2 | A3 | A4 | A5 | A6 | A7 | A8 |
| 1 | D11 | D21 | D31 | D41 | D51 | D61 | D71 | D81 |
| 2 | D12 | D22 | D32 | D42 | D52 | D62 | D72 | D82 |
| 3 | D13 | D23 | D33 | D43 | D53 | D63 | D73 | D83 |
| 4 | D14 | D24 | D34 | D44 | D54 | D64 | D74 | D84 |
| 5 | D15 | D25 | D35 | D45 | D55 | D65 | D75 | D85 |
| 6 | D16 | D26 | D36 | D46 | D56 | D66 | D76 | D86 |
| 7 | D17 | D27 | D37 | D47 | D57 | D67 | D77 | D87 |
| 8 | D18 | D28 | D38 | D48 | D58 | D68 | D78 | D88 |
| 9 | D19 | D29 | D39 | D49 | D59 | D69 | D79 | D89 |
| | B1 | B2 | B3 | B4 | B5 | B6 | B7 | B8 |
| | \multicolumn{8}{c}{LARGEST VALUE Bi OF INITIAL SETTING DATA} |

EXAMPLE WITH LARGEST STAGE NUMBER Jmax=10

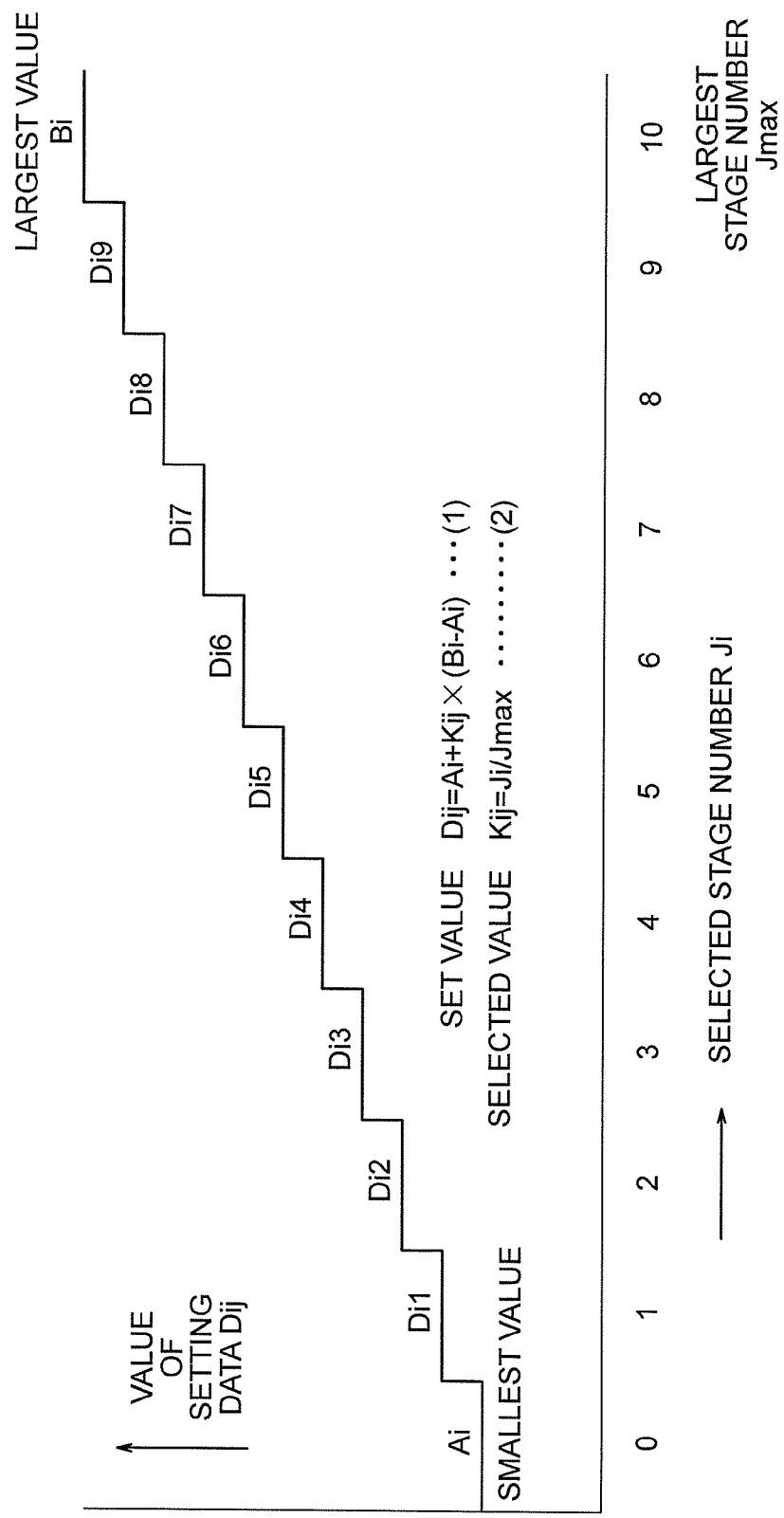

ELECTRONIC CONTROLLER TO BE CONNECTED TO PROGRAM TOOL

BACKGROUND OF THE INVENTION

1. Field of the Invention

The present invention relates to an electronic controller to be mounted in a vehicle, such as an engine controller, a transmission controller, a brake controller and the like, which are serially connected to each other through a local area network (LAN) transceiver, in particular, to improvement of the "electronic controller to be connected to a program tool" for application of an improved writing device for an input/output control program and a writing device for a variable control constant associated with the input/output control program.

2. Description of the Related Art

In an electronic controller including a program memory which stores an input/output control program therein and a microprocessor to cooperate with the program memory, the following is known. Specifically, an external tool, which is a writing/rewriting device for the input/output control program, and the electronic controller are connected to each other through a CAN bus which is an in-vehicle LAN so as to write and rewrite the input/output control program by using the bus communication line.

For example, according to FIG. 1 of "communication device for on-vehicle electronic control device" described in Japanese Patent Application Laid-open No. 2005-297653, the following technology is disclosed. Specifically, a rewrite-target electronic control unit 10 stops self-diagnosis and transmission of the result of self-diagnosis based on a write start request signal from an external tool 20. Non-rewrite target electronic control units 12 and 14 stop self-diagnosis and transmission of the results of self-diagnosis based on the write start request signal from the external tool 20 and a self-diagnosis stop request signal from the rewrite-target electronic control unit, or a self-diagnosis stop request signal from the rewrite-target electronic control unit and a self-diagnosis result transmission stop signal from another non-rewrite target electronic control unit. After the stop of the self-diagnosis and the stop of the transmission of the results of self-diagnosis in the rewrite-target electronic control unit 10 and the non-rewrite target electronic control units 12 and 14, the external tool 20 transmits data to the rewrite-target electronic control unit 10 to rewrite the control program. In the above-mentioned manner, in the case where the control program stored in one of the plurality of electronic control units which are connected to each other through the communication line is to be rewritten, an erroneous operation caused by the detection of an abnormality by another one of the electronic control units is prevented.

Moreover, the following is also known. A non-volatile flash memory which is electrically readable and writable is used as the program memory. The program memory is divided into a control-program storage area and an adjustment-value storage area, and write and rewrite can be performed for each of the storage areas.

For example, according to FIGS. 2 and 7 of "controller, and apparatus, method and program for rewriting" described in Japanese Patent Application Laid-open No. 2006-331185, the following technology is disclosed. Specifically, a storage section 11 of a controller 10 is configured to have two areas, that is, an adjustment-value storage part 11a and a program storage part 11b. Moreover, a rewrite processing section 23a of a rewrite device 20 is configured to perform program rewrite processing for rewriting a control program stored in the program storage part 11b of the controller 10 with a new control program and/or adjustment-value rewrite processing for rewriting an adjustment value stored in the adjustment-value storage part 11a with a new adjustment value. Further, a rewrite check processing section 23b of the rewrite device 20 is configured to verify whether or not the rewrite processing has been successfully performed. In this manner, the controller 10 capable of reducing manufacturing cost and ensuring product quality even after stored data is changed and the rewrite device 20 therefor are provided.

Moreover, the rewrite device 20 includes communication means for intercommunication with the controller 10 through an in-vehicle LAN. By the communication means, the data stored in the memory included in the controller 10 is rewritten.

Further, the following is also known. A non-volatile flash memory which is electrically readable and writable is used as the program memory. The program memory is divided into a main flash area for storing the control program therein and a boot flash area for storing a boot program therein, and write and rewrite on each of the areas can be performed.

For example, according to FIG. 1 of "memory rewrite system for electronic device" described in Japanese Patent Application Laid-open No. 10-149282, a memory rewrite device 4 includes a microcomputer 30, a power-supply circuit 32, and a rewrite switch SW. The microcomputer 30 includes a CPU, a ROM, a RAM, and the like for executing processing for controlling a microcomputer 8 of an ECU 2 to rewrite a flash ROM 20. The power-supply circuit 32 supplies, in accordance with a command from the microcomputer 30, a rewrite voltage Vpp (12 V in the embodiment) required to rewrite data in the flash ROM 20 to the microcomputer 8 of the ECU 2. The rewrite switch SW is used to switch an operation mode of the ECU 2 from a normal mode for engine control to a rewrite mode for rewriting the data in the flash ROM 20.

The flash ROM 20 is divided into a main flash area 20a for storing a control program for engine control and a boot flash area 20b for storing a boot program to be executed immediately after reset is cancelled.

Further, the memory rewrite device 4 includes a first ROM 34, a second ROM 36, and a display device 37. The first ROM 34 stores rewrite control software (specifically, a program code which configures the rewrite control software and data to be referred to at the time of execution of the program) to be transmitted to the ECU 2. The second ROM 36 stores write data (specifically, a new program to be written in the flash ROM 20; hereinafter also referred to as "new software") to be transmitted to the ECU 2. The display device 37 displays various messages in accordance with a command from the microcomputer 30. The first ROM 34 and the second ROM 36 are provided to the memory rewrite device 4 so as to be removable therefrom through known IC sockets 38 and 40, respectively.

(1) Description of Problems of the Related Art

In the "communication device for on-vehicle electronic controller" according to Japanese Patent Application Laid-open No. 2005-297653 cited above, it is presumed that at least a boot program compatible with the CAN protocol is stored in advance in each of the electronic controllers such as the engine controller 10, the transmission controller 12, and the brake controller 14 which are interconnected to each other by the CAN bus. It is further presumed that the intercommunication at least with the external tool 20 can be performed when a power switch 22 is turned ON. However, there is a problem in that protective measures for preventing the control program from being erroneously rewritten by an erroneous operation of the external tool or an erroneous operation induced by noise are not taken.

Moreover, even when each of the electronic controllers already has the boot program, there is a problem in view of quality assurance if all the input/output control programs are freely rewritable by the third party other than a manufacturer of the electronic controllers.

On the other hand, in the "controller, and device, method and program for rewriting" described in Japanese Patent Application Laid-open No. 2006-331185 cited above, the storage section 11 is divided into the two areas, that is, the adjustment-value storage part 11a and the program storage part 11b. The rewrite device 20 can write the program or the adjustment value in each of the individual areas.

Therefore, it is possible to pay attention to allow the manufacturer of the electronic controllers to write the program and the adjustment value and to allow a user only to write the adjustment value.

However, there is a problem in that protective measures for preventing the control program from being erroneously rewritten by the erroneous operation of the external tool or the erroneous operation due to noise when the user writes the adjustment value are not taken. In the case where whether the rewrite is for the program or the adjustment value is to be determined by the LAN communication, there is a risk of write of an erroneous program in the program storage part 11b when a boot program is started by error.

In the "memory rewrite system for electronic device" according to Japanese Patent Application Laid-open No. 10-149282 cited above, the memory rewrite device 4 is configured to be able to write the boot program and the input/output control program in the ECU 2 which is an initial product. However, there is a problem in that, for setting a write mode of the program, the rewrite switch SW is provided to the memory rewrite device 4, a connector pin for receiving a rewrite switch signal is required to be provided to the ECU 2, and a dedicated signal line for mode setting is required.

SUMMARY OF THE INVENTION

The present invention has been made to solve the problems described above, and has an object to provide an electronic control apparatus capable of eliminating need of a rewrite switch and a dedicated signal line for setting a write mode, in a shipping adjustment step for the electronic control apparatus, in which a first external tool and an electronic controller are serially connected to transfer a control program to the electronic controller and capable of easily determining, for setting a write mode, the write mode without depending on serial communication information nor an operating state of a microprocessor of the electronic controller which is in a non-started state.

An "electronic control apparatus to be connected to a program tool" according to one embodiment of the present invention includes: an electronic controller including a control microprocessor for controlling driving of an electric load externally connected through an output interface circuit in accordance with an operating state of a sensor externally connected through an input interface circuit and a content of an input/output main control program (CPROG) which is a part of a total control program (TCPRG) stored in an electrically readable and writable non-volatile program memory; and a first external tool including: a source memory having the total control program (TCPRG) written therein; and a transfer microprocessor for transferring and writing the total control program (TCPRG) to the program memory, the electronic controller and the first external tool being serially connected to each other. The serial connection uses a local area network (LAN) transceiver in which a master-station driver and a master-station receiver of the first external tool and a slave-station receiver and a slave-station driver of the electronic controller are connected to each other by a pair of communication lines (LANH, LANN). The pair of communication lines (LANH, LANN) are each a general-purpose communication line which is serially connectable to at least a second external tool replacing the first external tool. The control microprocessor further includes: a RAM memory for computation processing; a non-volatile boot program memory, which is a part of an area of the program memory or is connected after division; and a data memory for storing one of a control constant to be variably set and a control constant including a part of a control program, the data memory being a part of an area of the program memory or being connected after division. The boot program memory stores in advance a transfer control program (TPRG) for transferring and writing the total control program (TCPRG) through the LAN transceiver.

Then, the first external tool further includes: a control power supply for supplying a control voltage (Vcc) to the master-station driver and the master-station receiver; and a high-voltage power supply for supplying a high voltage (Vaa) to at least one of the pair of communication lines (LANH, LANN) in accordance with a switching signal (MOD) generated by the first external tool before the total control program (TCPRG) is transferred, the high voltage (Vaa) being higher than the control voltage (Vcc) and equal to or lower than a withstanding voltage at which the LAN transceiver operates normally. When the total control program (TCPRG) is transferred from the first external tool to be written to the electronic controller, the high voltage (Vaa) is applied to one of the pair of communication lines (LANH, LANN) at least until the control microprocessor recognizes a program write mode. The electronic controller further includes a comparison circuit for determining whether or not a signal voltage transmitted by the communication lines (LANH, LANN) exceeds at least the control voltage (Vcc). When the comparison circuit detects a high voltage exceeding the control voltage (Vcc), a write-mode signal (WM) is generated by a write-mode determination circuit while the control microprocessor is initialized to be restarted by a reset-pulse generation circuit, and the restarted control microprocessor recognizes a write mode based on the write-mode signal (WM) and receives the total control program (TCPRG) transmitted from the first external tool by referring to the boot program memory to transfer the total control program (TCPRG) to be stored in one of the program memory, and the program memory and the data memory. The high-voltage power supply is one of blocked and excluded with respect to the second external tool, and the second external tool writes the control constant to the data memory based on a content of a telecommunication control program (TPRGU) which is another part of the total control program (TCPRG).

As described above, in the electronic control apparatus to be connected to a program tool according to one embodiment of the present invention, the electronic controller including the control microprocessor to cooperate with the electrically readable and writable non-volatile program memory and the first external tool including the source program for transferring and writing the program to the program memory are configured to be serially connected to each other by the general-purpose LAN transceiver. By detecting that the signal voltage received by the transceiver is a high voltage higher than a normal signal voltage, the electronic controller recognizes the connection of the first external tool to transfer and write the program. In this manner, the transfer of the program from the first external tool to the electronic controller is executed.

Thus, a write-mode setting switch is not required to be connected to the electronic controller to set the write mode. As a result, the effect of reducing the number of connector pins of the electronic controller to provide a small and inexpensive electronic control apparatus is provided.

Moreover, in order to set the write mode, the electronic controller determines whether the mode is the write mode based on the comparison circuit for comparing the magnitude of the received signal voltage, without depending on the serial communication information even when a serial communication line is used. Therefore, the effect of readily determining the write mode without depending on the operating state of the control microprocessor is provided.

Further, even when the second external tool for writing the control constant is connected to the general-purpose serial communication line, there is no risk of erroneous switching to the transfer/write mode of the program to break the total control program which has already been written and stored. Therefore, the effect of improving the reliability of the total control program is provided.

BRIEF DESCRIPTION OF THE DRAWINGS

FIG. 11 is a setting table of initial setting data of the electronic control apparatus to be connected to the program tool illustrated in FIG. 8.

FIG. 12 is a graph for showing the initial setting data of the electronic control apparatus to be connected to the program tool illustrated in FIG. 8.

DETAILED DESCRIPTION OF THE PREFERRED EMBODIMENTS

First Embodiment (1) Detailed Description of Configuration

In the following, an "electronic control apparatus to be connected to a program tool" according to a first embodiment of the present invention is described referring to FIG. 1 which is an overall block diagram of the electronic control apparatus.

Figure 1:
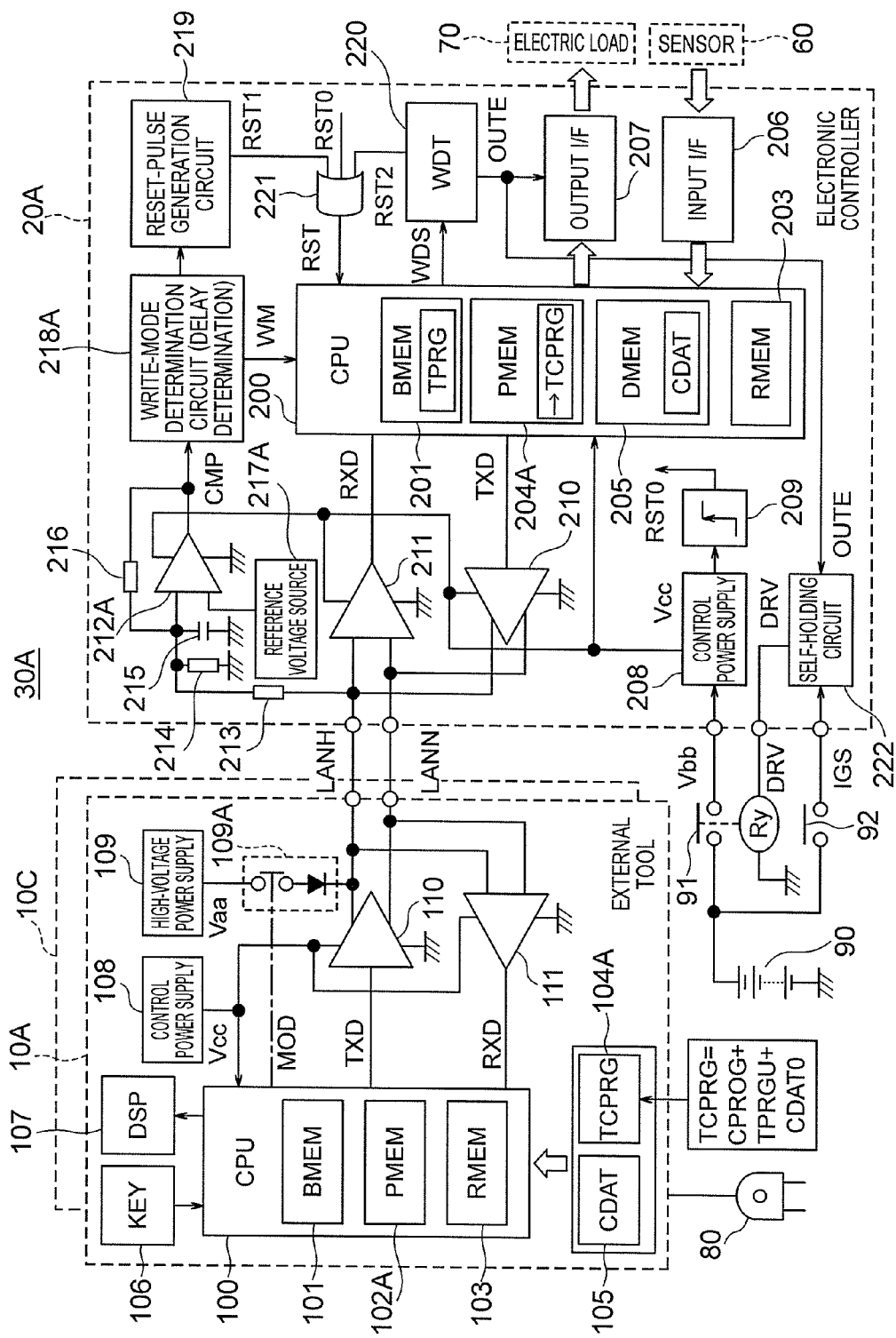
FIG. 1 is an overall block diagram of an electronic control apparatus to be connected to a program tool according to a first embodiment of the present invention.

FIG. 1 illustrates an electronic control apparatus 30A to be connected to a program tool, including a first external tool 10A and an electronic controller 20A, which are connected to each other by communication lines LANH and LANN. The first external tool 10A is a program writing device, and is equipment in a manufacturing line provided in a shipping adjustment step of the electronic controller 20A. The electronic controller 20A is a product in an uncompleted state, which is sequentially transferred to a final shipping adjustment line. After a control program is written in the electronic controller 20A by the first external tool 10A, a performance test is conducted on the electronic controller 20A by using a sensor 60 and an electric load 70 which are connected thereto in a simulated manner.

The first external tool 10A is operated by power fed from a commercial power supply through a power line 80. A control power supply 108 provided in the first external tool 10A generates a stabilized control voltage Vcc at, for example, DC 5 V. A high-voltage power supply 109 generates a stabilized high voltage Vaa at, for example, DC 20 V.

A microprocessor 100 for transfer (hereinafter referred to as "transfer microprocessor 100"), which is a main constituent element of the first external tool 10A, is driven by power feeding with the control voltage Vcc to transfer a program described below to the electronic controller 20A in cooperation with a boot program memory 101, a tool-control program memory 102A, and a RAM memory 103.

In a source memory 104A, which is, for example, a memory cassette, a total control program TCPRG to be transferred from the first external tool 10A to a program memory 204A included in the electronic controller 20A is stored.

In a source memory 105, which is, for example, a memory cassette, initial setting data CDAT to be transferred from the first external tool 10A to a data memory 205 included in the electronic controller 20A is stored.

The total control program TCPRG includes an input/output main control program CPROG, temporary setting data CDAT0, and a telecommunication control program TPRGU, which are described later.

An operation key 106 (keyboard) and a display 107 (display device) are provided as man-machine interfaces to the first external tool 10A. A program transfer/write command is generated by the operation key 106. Information indicating write completion or abnormality occurrence information is displayed on the display 107.

When any input/output control program, initial setting data, or temporary setting data is already stored in the electronic controller 20A, these stored data is erased altogether so that a new program is to be transferred to the electronic controller 20A to be written therein.

A driver 110 for LAN communication (hereinafter referred to as "master-station driver 110") provided in the first external tool 10A outputs a pair of output signals for driving the pair of communication lines LANH and LANN so that a mode is set to a dominant mode in which the output of one communication line LANH is at a logic level "H" and the output of the other communication line LANN is at a logic level "L" when a logic level of a transmission logic signal TXD generated by the transfer microprocessor 100 is a dominant logic (for example, "L"), as described later in details referring to FIGS. 2(A) and 2(B).

When the logic level of the transmission logic signal TXD is a recessive logic (for example, "H"), the mode is set to a recessive mode in which the output logic levels of the pair of communication lines LANH and LANN are both placed in a floating state at an intermediate voltage of the control voltage Vcc which is a power-supply voltage applied to the master-station driver 110.

A receiver 111 for LAN communication (hereinafter referred to as "master-station receiver 111") provided in the first external tool 10A generates a reception logic signal RXD operating in accordance with a differential signal voltage between the pair of communication lines LANH and LANN and inputs the generated reception logic signal RXD to the transfer microprocessor 100. The reception logic signal RXD becomes the dominant logic (for example, "L") when the communication lines LANH and LANN are in the dominant mode and becomes the recessive logic (for example, "H") when the communication lines LANH and LANN are in the recessive mode.

A high-voltage power switch 109A is a transistor switch which operates in accordance with a switching signal MOD generated by the transfer microprocessor 100. When the high-voltage power switch 109A is closed, the high voltage Vaa generated by the high-voltage power supply 109 is applied to the communication line LANH.

A value of the high voltage Vaa is larger than that of the control voltage Vcc which is a power-supply voltage of the master-station driver 110, and is desirably further larger than that of a drive voltage Vbb described below, which is a power-supply voltage of the electronic controller 20A, and lower than a withstanding voltage of all the drivers and receivers connected to the communication lines LANH and LANN.

An external power supply 90 is, for example, a ground power supply corresponding to an in-vehicle battery. When an output element 91 of a power relay Ry is closed, the external power supply 90 supplies the drive voltage Vbb of, for example, a DC 12 V system to the electronic controller 20A.

The power relay Ry is energized when a power switch 92 is closed. The power relay Ry is configured so that, even when the power switch 92 is opened, the energized state is maintained by a self-holding drive output DRV generated by the electronic controller 20A for a while (for a predetermined time period or shorter). The power relay Ry is de-energized after elapse of the predetermined time period.

The control microprocessor 200, which is a main constituent element of the electronic controller 20A, operates using the control voltage Vcc generated by the control power supply 208 as a power supply. The control microprocessor 200 operates in accordance with an operating state of the sensor 60 as inspection equipment connected through an input interface circuit 206 to control driving of the electric load 70 as inspection equipment connected through an output interface circuit 207.

When the control power supply 208 rises, a power-ON detection pulse generation circuit 209 generates a power-ON reset signal RST0 to initialize and start the control microprocessor 200 through an OR element 221.

The boot program memory 201 is a partial area of a program memory 204A described later, which is, for example, a flash memory, or a ROM memory connected thereto after division. The boot program memory 201 stores a transfer control program TPRG for controlling the first external tool 10A and the electronic controller 20A to transfer the total control program TCPRG from the source memory 104A to the program memory 204A based on a predetermined LAN communication protocol.

The program memory 204A is, for example, a non-volatile flash memory, from which data can be erased at once in a block unit. The total control program TCPRG is transferred from the source memory 104A to the program memory 204A so as to be stored therein.

The data memory 205 is a partial area of the program memory 204A described above which is, for example, the flash memory, or an electrically readable and writable non-volatile memory which is connected thereto after division. The initial setting data CDAT is transferred from the source memory 105 to the data memory 205 so as to be stored therein.

The total control program TCPRG stored in the program memory 204A includes the input/output main control program CPROG, the telecommunication control program TPRGU, and the temporary setting data DCAT0. The input/output main control program CPROG controls the driving of the electric load 70 in accordance with the operating state of the sensor 60 connected to the electronic controller 20A. The telecommunication control program TPRGU uses a second external tool 10C described later to transfer the initial setting data CDAT to the data memory 205. The temporary setting data CDAT0 is used in substitution for the initial setting data CDAT until the initial setting data CDAT is written.

The RAM memory 203 for computation processing relays transfer information from the source memories 104A and 105 of the first external tool 10A to the program memory 204A and the data memory 205 of the electronic controller 20A. During an actual operation of the electronic controller 20A, the RAM memory 203 is used as a storage medium for learning and storing a time history (namely, a change with time) of a variable control constant to sequentially update and correct the content of the initial setting data CDAT.

Even when the output element 91 of the power relay is opened, the RAM memory 203 retains written information by a backup power supply (not shown).

When the initial setting data CDAT is not stored, the control microprocessor 200 performs the input/output control based on an input/output control program CPROG+CDAT0 based on the input/output main control program CPROG and the temporary setting data CDAT0. When the initial setting data CDAT is stored, the control microprocessor 200 performs the input/output control based on an input/output control program CPROG+CDAT based on the input/output main control program CPROG and the initial setting data CDAT. In this manner, a part of the initial setting data CDAT is corrected by a learning computation function of the control microprocessor 200.

A receiver 211 (hereinafter referred to as "slave-station receiver 211") provided to the electronic controller 20A, which operates by using the control voltage Vcc as a power-supply voltage, and a driver 210 (hereinafter referred to as "slave-station driver 210") are connected to the first external tool 10A through the communication lines LANH and LANN. The reception logic signal RXD obtained from the slave-station receiver 211 is input to the control microprocessor 200. The transmission logic signal TXD generated by the control microprocessor 200 is transmitted to the first external tool 10A through the slave-station driver 210.

As described later referring to FIG. 8, the slave-station driver 210 and the slave-station receiver 211 can freely exchange a signal between the slave stations even if the master station is not present.

Voltage-dividing resistors 213 and 214 and a smoothing capacitor 215 divide a voltage between the communication line LANH and a ground circuit GND, and input the obtained voltage as a first input signal voltage to a positive input terminal of a comparison circuit 212A.

A positive feedback resistor 216 is connected between an output terminal and the positive input terminal of the comparison circuit 212A, and operates in accordance with an output logic level of the comparison circuit 212A to change a value of the first input signal voltage, thereby providing a hysteresis characteristic thereto.

To a negative input terminal of the comparison circuit 212A, for example, DC 2.1 V is applied as a second input signal voltage from a reference voltage source 217A.

Therefore, a resistance value of the positive feedback resistor 216 is determined as follows: When the first input signal voltage is increased to 2.1 V or higher, a logic level of a determination logic signal CMP which is an output signal of the comparison circuit 212A becomes "H"; When the output logic level becomes "H", the logic level "H" is maintained until the first input signal voltage is lowered to, for example, 1.6 V or lower; When the first input signal voltage becomes lower than 1.6 V, the logic level returns to "L".

On the other hand, a voltage division ratio by the voltage-dividing resistor 214 when the voltage-dividing resistor 214 and the positive feedback resistor 216 are connected in parallel (214//216) is, for example, 1/8. In this case, when the high voltage Vaa=20 V is applied to the communication line LANH, the first input signal voltage becomes 20/8=2.5 V. Therefore, an operation of the comparison circuit 212A becomes reliable, and hence the logic level of the determination logic signal CMP becomes "H".

However, when the signal voltage Vcc of the communication line LANH is equal to 5 V, the first input single voltage is divided to 5/8=0.6 V. A non-operation of the comparison circuit 212A becomes reliable, and hence the logic level of the determination logic signal CMP becomes "L".

Moreover, during the actual operation of the electronic controller 20A, the communication line LANH comes into contact with a positive wiring of the external power supply 90. When the drive voltage Vbb at this time is from 12 V to 16 V, the first input signal voltage becomes 12 to 16/8=1.5 V to 2.0 V. Therefore, the logic level of the determination logic signal CMP does not become "H".

A write-mode determination circuit 218A generates a write-mode signal WM based on the maintenance of the output logic level "H" of the determination logic signal CMP for a predetermined duration time period.

A reset-pulse generation circuit 219 generates a first reset signal RST1 in response to the write-mode signal WM generated by the write-mode determination circuit 218A. With the first reset signal RST1, the reset-pulse generation circuit 219 initializes and restarts the control microprocessor 200 through the OR element 221.

After the start of the control microprocessor 200, a watchdog signal WDS which is a pulse-train signal whose cycle is equal to or smaller than a predetermined cycle is generated. When a pulse width of the watchdog signal WDS is equal to or smaller than a predetermined value, a watchdog timer 220 generates an output allowance signal OUTE to allow the output interface circuit 207 to generate an output, and works on a self-holding circuit 222 to generate the self-holding drive output DRV to the power relay Ry.

However, when the pulse width of the watchdog signal WDS exceeds the predetermined value, the output allowance signal OUTE is stopped. Then, a second reset signal RST2 is generated to initialize and restart the control microprocessor 200 through the OR element 221.

Figure 2A:
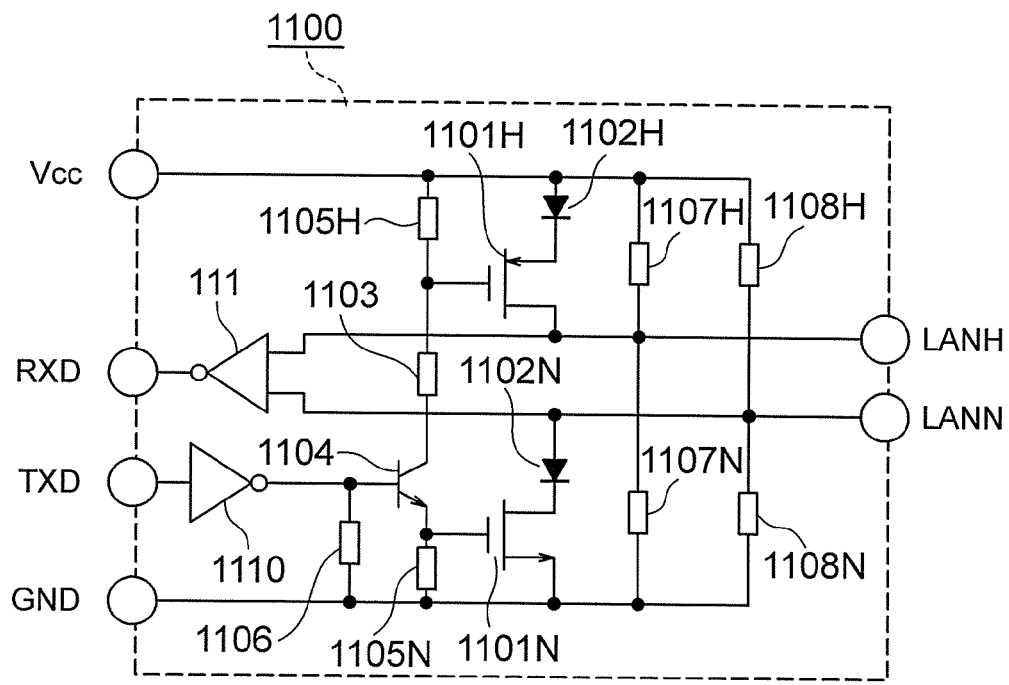
FIG. 2(A) is a circuit diagram for illustrating a LAN transceiver of the electronic control apparatus to be connected to the program tool illustrated in FIG. 1.
Figure 2B:
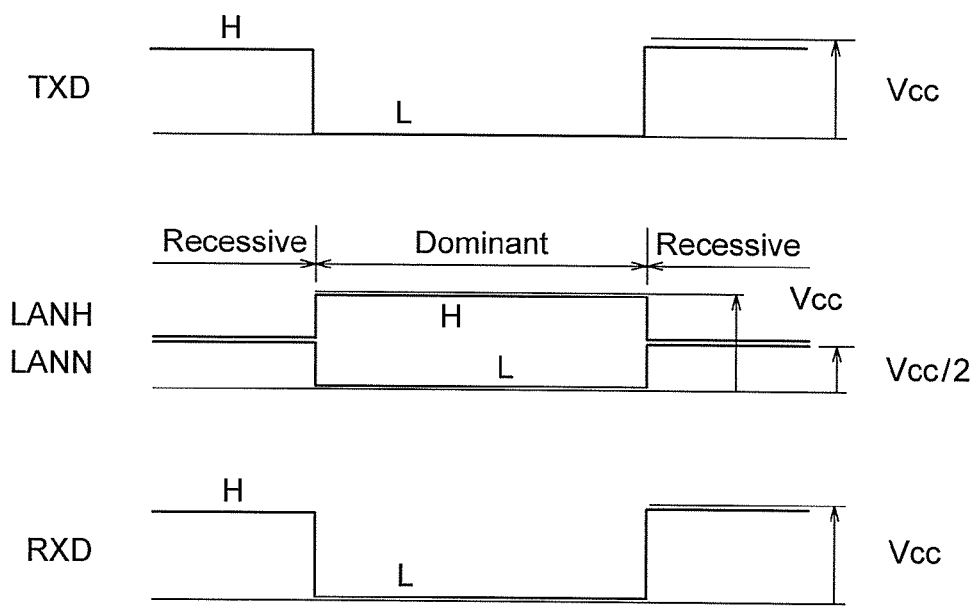
FIG. 2(B) is a time chart of the LAN transceiver.

Next, the description continues referring to FIGS. 2(A) and 2(B) which are a circuit diagram and a time chart for illustrating the LAN transceiver illustrated in FIG. 1.

In FIG. 2(A), a LAN transceiver 1100 is configured by integrating the master-station driver 110 and the master-station receiver 111. The LAN transceiver 1100 includes an upstream transistor 1101H, an upstream diode 1102H, a downstream transistor 1101N, and a downstream diode 1102N. The upstream transistor 1101H is connected to a positive-side wiring to which the control voltage Vcc is applied. The upstream diode 1102H is serially connected to the upstream transistor 1101H. The downstream transistor 1101N is connected to the ground circuit GND. The downstream diode 1102N is serially connected to the downstream transistor 1101N. A downstream end of the upstream transistor 1101H is connected to an upstream output terminal for connection to the communication line LANH. An upstream end of the downstream transistor 1101N is connected to a downstream output terminal for connection to the communication line LANN.

A gate terminal of the upstream transistor 1101H which is a P-channel type field-effect transistor and a gate terminal of the downstream transistor 1101N which is an N-channel type field effect transistor are connected by a serial circuit formed by a drive resistor 1103 and a drive transistor 1104 which is an NPN-type transistor. When the drive transistor 1104 is electrically conducted, the upstream transistor 1101H and the downstream transistor 1101N are also electrically conducted.

An upstream gate resistor 1105H is connected between the gate terminal of the upstream transistor 1101H and the positive-side wiring, whereas a downstream gate resistor 1105N is connected between the gate terminal of the downstream transistor 1101N and the ground circuit GND. In this manner, when the drive transistor 1104 is opened, the upstream transistor 1101H and the downstream transistor 1101N are opened.

An open-circuit ballast resistor 1106 is connected between a base terminal of the drive transistor 1104 and the ground circuit GND so that a base voltage is applied to the drive transistor 1104 through a logic inversion element 1110 to which the transmission logic signal TXD is input.

A connection point between upstream voltage-dividing resistors 1107H and 1107N which are connected between the positive-side wiring and the ground circuit GND is connected to an upstream output terminal of the communication line LANH.

A connection point between downstream voltage-dividing resistors 1108H and 1108N which are connected between the positive-side wiring and the ground circuit GND is connected to a downstream output terminal of the communication line LANN.

A positive-side input terminal of the master-station receiver 111 configured by a differential amplifier is connected to the upstream output terminal of the communication line LANH, whereas a negative-side input terminal is connected to the downstream output terminal of the communication line LANN. An output terminal of the master-station receiver 111 generates the reception logic signal RXD.

In FIG. 2(B), when the logic level of the transmission logic signal TXD is set at "H", the drive transistor 1104 is opened so that the upstream transistor 1101H and the downstream transistor 1101N become non-conductive. As a result, the mode becomes the recessive mode in which the upstream output terminal of the communication line LANH is at an intermediate voltage determined by a voltage-division ratio of the upstream voltage-dividing resistors 1107H and 1107N and the downstream output terminal of the communication line LANN is at an intermediate voltage determined by a voltage-division ratio of the downstream voltage-dividing resistors 1108H and 1108N. An input circuit of the master-station receiver 111 is configured so that the logic level of the reception logic signal RXD becomes "H" in this state.

When the logic level of the transmission logic signal TXD is set at "L", the drive transistor 1104 is closed so that the upstream transistor 1101H and the downstream transistor 1101N become conductive. As a result, the mode is switched to the dominant mode in which the logic level of the upstream output terminal of the communication line LANH becomes "H" and the logic level of the downstream output terminal of the communication line LANN becomes "L". In this state, the logic level of the reception logic signal RXD becomes "L".

In the first embodiment, when the logic levels of the communication lines LANH and LANN are in the dominant mode, the logic levels of the transmission logic signal TXD of the driver and the reception logic signal RXD of the receiver become "L". On the other hand, when the mode is the recessive mode, the logic levels of the transmission logic signal TXD of the driver and the reception logic signal RXD of the receiver become "H". However, when the logic inversion element is inserted into an input circuit of the driver or an output circuit of the receiver, the logic levels of the input and output are inverted.

The upstream diode 1102H included in the LAN transceiver 1100 illustrated in FIG. 2(A) blocks a current flowing from the high-voltage power supply 109 to the control power supply 108 when the high-voltage power switch 109A illustrated in FIG. 1 is closed.

Moreover, a series diode contained in the high-voltage power switch 109A illustrated in FIG. 1 prevents short-circuit connection of the communication line LANH to the ground circuit GND when the high-voltage power supply 109 stops outputting.

On the other hand, the downstream diode 1102N included in the LAN transceiver 1100 illustrated in FIG. 2(A) can apply a negative voltage to the communication line LANN.

Therefore, the high voltage for instructing the write mode only needs to be a voltage which is different from the control voltage Vcc. Therefore, by the application of the negative voltage to the communication line LANN, the write mode can be instructed. In this case, however, each of the first external tool 10A and the electronic controller 20A is required to include a negative-voltage power supply. Therefore, the above-mentioned measure is not advantageous.

(2) Detailed Description of Functions and Operation

Figure 3:
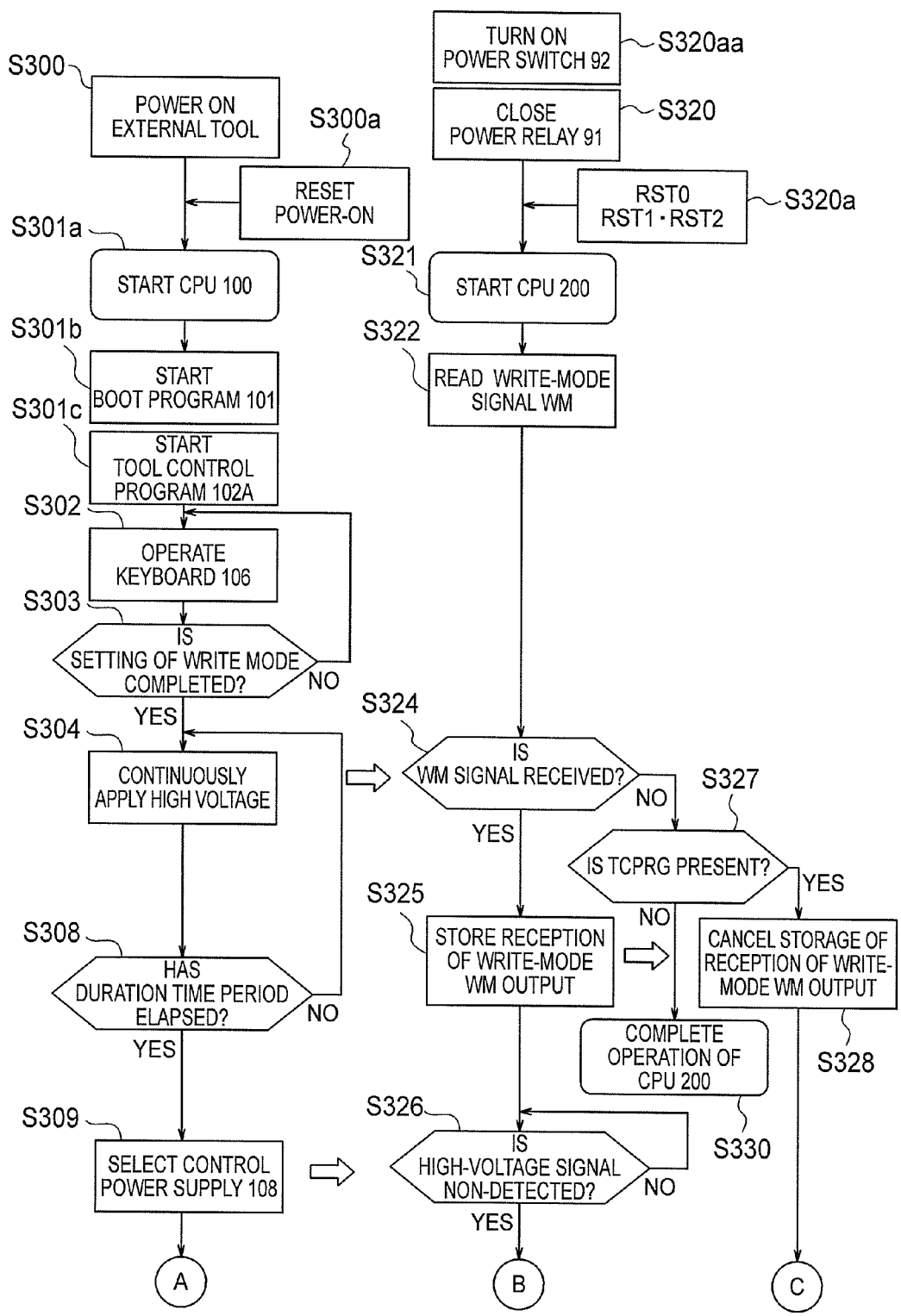
FIG. 3 is a flowchart illustrating a first half of a control operation of the electronic control apparatus to be connected to the program tool illustrated in FIG. 1.
Figure 4:
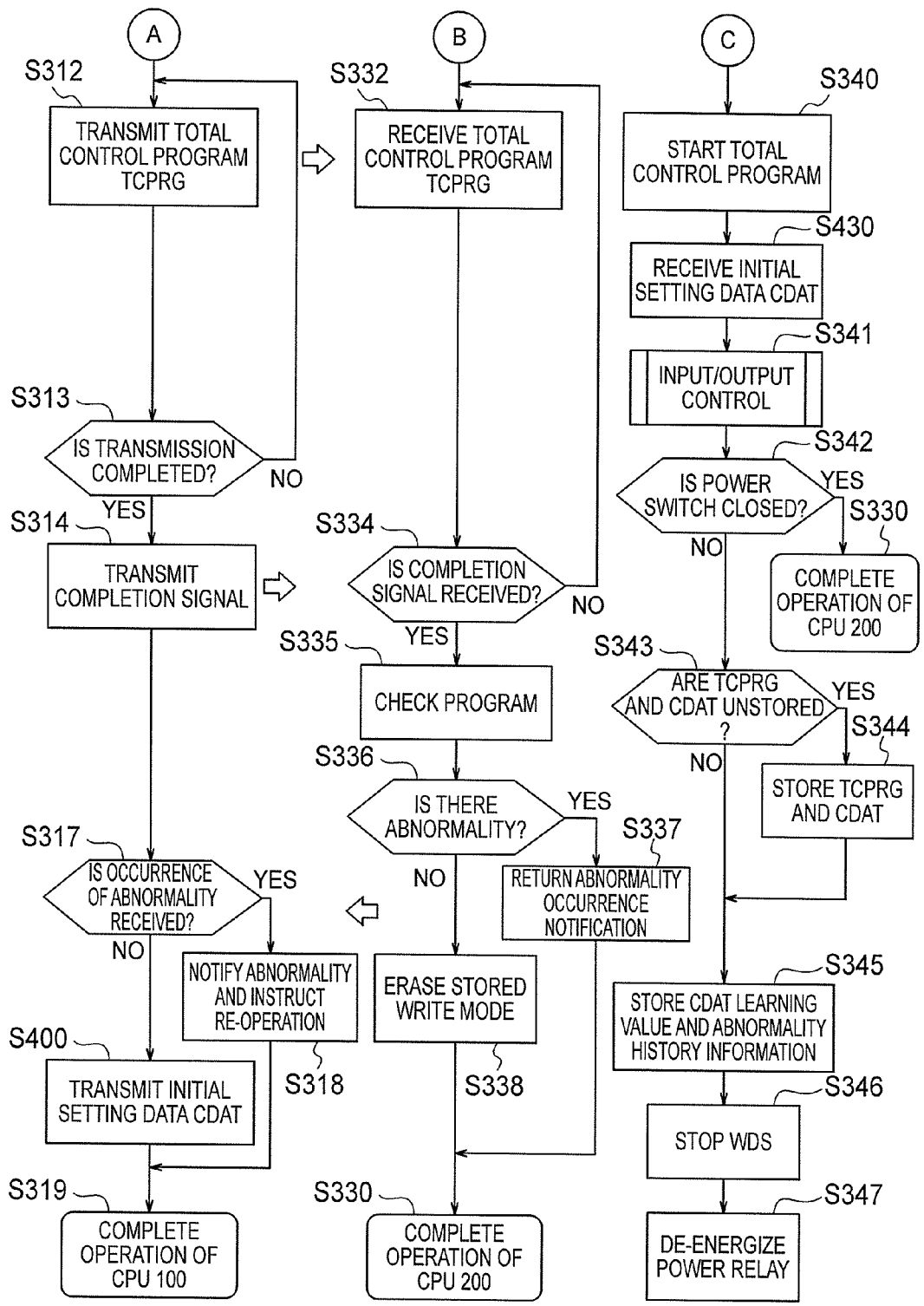
FIG. 4 is a flowchart illustrating a second half of the control operation of the electronic control apparatus to be connected to the program tool illustrated in FIG. 1.

In the following, functions and operation are described in detail referring to FIGS. 3 and 4. FIG. 3 is a flowchart illustrating a first half of a control operation of the electronic control apparatus 30A to be connected to the program tool illustrated in FIG. 1, and FIG. 4 is a flowchart illustrating a second half of the control operation.

First, as illustrated in FIG. 3, in Step S300, the first external tool 10A is powered ON. Then, a power-ON reset circuit (not shown) works (see Step S300a) to initialize the transfer microprocessor 100. Then, in Step S301a, a program transfer control operation is started.

In subsequent Step S301b, a boot program stored in the boot program memory 101 is first executed. However, when the tool control program is already written in the tool control program memory 102A, the processing immediately proceeds to Step S301c. Then, the tool control program is executed in steps from subsequent Step S302 to Step S319 illustrated in FIG. 4.

In Step S302, operation information of the operation key 106 is read out. In subsequent Step S303, it is determined whether or not the key operation in Step S302 has been performed on a key for setting the write mode. When the key for the write mode is operated, it is determined as YES. Then, the processing proceeds to Step S304. On the other hand, when the key for the write mode is not operated, it is determined as NO. Then, the processing returns to Step S302. Thereafter, the key for the write mode is waited to be pressed while Steps S302 and S303 are alternately repeated.

On the other hand, after the power switch 92 is turned ON in Step S320aa, the output element 91 of the power relay Ry is closed in subsequent Step S320 to apply the drive voltage Vbb to the electronic controller 20A.

As a result, the control power supply 208 generates the control voltage Vcc to supply the control voltage Vcc to each of the sections including the control microprocessor 200, the slave-station receiver 211, and the slave-station driver 210. At the same time, the power-ON detection pulse generation circuit 209 generates the power-ON reset signal RST0 to initialize the control microprocessor 200 through the OR element 221 (see Step S320a). Then, in Step S321, the control operation is started.

In subsequent Step S322, the write-mode determination circuit 218A reads out information whether the write-mode signal WM is generated. Then, the processing proceeds to Step S324.

In Step S324, when the write-mode signal WM is generated, it is determined as YES. Then, the processing proceeds to Step S325. On the other hand, when the write-mode signal WM is not generated, it is determined as NO. Then, the processing proceeds to Step S327.

In Step S327, whether or not the total control program TCPRG is stored in the program memory 204A in Step S344 described later referring to FIG. 4 is determined. If the total control program TCPRG has already been written and stored, it is determined as YES. Then, the processing proceeds to Step S328. If the total control program TCPRG has not been written yet, it is determined as NO. Then, the processing proceeds to an operation termination step S330.

In the boot program memory 201, the transfer control program TPRG for allowing the first external tool 10A and the electronic controller 20A to transfer the total control program TCPRG based on the LAN communication protocol is stored in advance.

Therefore, in a state in which the total control program TCPRG is not stored yet, the processing proceeds to the operation start step S321 in a circulating manner through the operation termination step S330. The control microprocessor 200 executes the operation start step S321, Steps S322, S324, and S327, and the operation termination step S330 in a circulating manner, and is placed in a waiting state for the generation of the write-mode signal WM.

In Step S328, the information of generation of the write-mode signal WM, which is stored in Step S325 described below, is erased. Thereafter, the processing proceeds to Step S340 illustrated in FIG. 4.

When an operation for setting the write mode is performed in the first external tool 10A, the switching signal MOD is generated in Step S304. As a result, the high-voltage power switch 109A is closed to apply the high voltage Vaa to the communication line LANH.

In subsequent Step S308, it is determined whether or not a time period of generation of the switching signal MOD becomes equal to a predetermined duration time period. When the time period is not equal to the predetermined duration time period, it is determined as NO. Then, the processing returns to Step S304 to maintain the application of the high voltage Vaa. When the time period becomes equal to the predetermined duration time period, it is determined as YES. Then, the processing proceeds to Step S309.

In Step S309, the switching signal MOD is cancelled. After the signal voltage generated by the master-station driver 110 or the slave-station driver 210 is applied to the pair of communication lines LANH and LANN, the processing proceeds to Step S312 illustrated in FIG. 4.

On the other hand, the electronic controller 20A escapes from the circulation loop described above based on the determination "YES" in Step S324. In Step S325, the generation of the write-mode signal WM is stored. Then, the processing proceeds to Step S326.

In subsequent Step S326, it is determined whether or not the logic level of the write-mode signal WM generated by the write-mode determination circuit 218A returns to "L" to cancel the application of the high voltage Vaa to the communication line LANH. When the application of the high voltage Vaa is cancelled, it is determined as YES. Then, the processing proceeds to Step S332 illustrated in FIG. 4. On the other hand, when the application of the high voltage Vaa is not cancelled, it is determined as NO. Then, the processing returns to Step S326, and the cancellation of the application of the high voltage Vaa is waited for.

In FIG. 4 following FIG. 3, in Step S312 performed subsequently to Step S309, the total control program TCPRG stored in the source memory 104A is transmitted. As an operation on the electronic controller 20A side, in Step S332, the electronic controller 20A receives the total control program TCPRG transmitted in Step S312 and temporarily stores the received total control program TCPRG in the RAM memory 203. Then, in Step S344 described later, the total control program TCPRG is transferred to the program memory 204A.

Alternatively, the total control program TCPRG may be sequentially transferred in a unit of a plurality of bytes to the program memory 204A through the RAM memory 203 in Step S332.

In Step S313 subsequent to Step S312, it is determined whether or not the transmission of the total control program TCPRG is completed. When the transmission of the total control program TCPRG is not completed, it is determined as NO. Then, the processing returns to Step S312. When the transmission of the total control program TCPRG is completed, it is determined as YES. Then, the processing proceeds to Step S314 where a program transfer completion signal is transmitted to the electronic controller 20A.

In Step S334 subsequent to Step S332, whether or not the completion signal transmitted in Step S314 has been received is determined. When the completion signal has not been received, it is determined as NO. Then, the processing returns to Step S332. On the other hand, when the completion signal has been received, it is determined as YES. Then, the processing proceeds to Step S335.

In Step S335, the total control program TCPRG received in Step S332 is checked by code check means as represented by, for example, a CRC check to determine whether or not there is an abnormality. In subsequent Step S336, when there is no abnormality, it is determined as NO. Then, the processing proceeds to Step S338. When there is an abnormality, it is determined as YES. Then, the processing proceeds to Step S337.

In Step S337, an abnormality occurrence notification is returned to the first external tool 10A. Then, the processing proceeds to the operation termination step S330.

In Step S338, after the storage of the write-mode signal WM stored in Step S325 is cancelled, the processing proceeds to the operation termination step S330.

In Step S317 subsequent to Step S314, the abnormality occurrence information notified and returned in Step S337 is received to determine whether or not there is an abnormality. When there is an abnormality, it is determined as YES. Then, the processing proceeds to Step S318. When there is no abnormality, it is determined as NO. Then, the processing proceeds to Step S400.

In Step S318, the occurrence of the abnormality is notified by the display 107. Then, after a re-operation is instructed, the processing proceeds to the operation termination step S319.

In Step S400, the initial setting data CDAT stored in the source memory 105 is transmitted. Then, the processing proceeds to the operation termination step S319.

In Step S340 subsequent to Step S328 illustrated in FIG. 3, the total control program TCPRG received in Step S332 or the total control program TCPRG transferred to and stored in the program memory 204A in Step S344 described later is started.

In subsequent Step S430, the initial setting data CDAT transmitted in Step S400 is received by the telecommunication control program TPRGU contained in the total control program TCPRG started in Step S340, and is temporarily stored in the RAM memory 203.

In subsequent Step S341, input/output control is performed by the input/output main control program CPROG contained in the total control program TCPRG started in Step S340.

In subsequent Step S342, it is determined whether or not the power switch 92 input to the electronic controller 20A is closed. When the power switch 92 is closed, the processing proceeds to the operation start step S321 in the circulating manner through the operation termination step S330. On the other hand, when the power switch 92 is opened, it is determined as NO. Then, the processing proceeds to Step S343.

The determination of whether or not the power switch 92 is closed, which is made in Step S342, is executed at intervals shorter than a predetermined cycle, in the total control program TCPRG.

In Step S343, when the power switch 92 is opened for the first time and the total control program TCPRG and the initial setting data CDAT are not transferred to and stored in the program memory 204A or the data memory 205 yet, it is determined as YES. Then, the processing proceeds to Step S344. When the power switch 92 is opened again after the completion of transfer and storage, it is determined as NO. Then, the processing proceeds to Step S345.

In Step S344, the total control program TCPRG, which is received in Step S332 and is written in the RAM memory 203, is transferred to and stored at a predetermined address in the program memory 204A. At the same time, the initial setting data CDAT, which is received in Step S430 and is written in the RAM memory 203, is transferred to and stored at a predetermined address in the data memory 205.

In Step S345, a part of the initial setting data CDAT stored in Step S344, which is rewritten to a proper value learned and stored during the operation of the electronic controller 20A, and summary values for types of abnormality information generated during the operation are updated and stored as abnormality occurrence history information.

In Step S346, at the point of time at which the transfer processing to the program memory 204A or the data memory 205 in Step S344 or S345 is completed, the watchdog signal WDS is stopped.

In Step S347, based on the stop of the watchdog signal WDS, the watchdog timer 220 stops the output allowance signal OUTE. As a result, the self-holding circuit 222 stops the self-holding drive output DRV to de-energize the power relay Ry.

In an actual operation state in which the transfer of the program to the program memory 204A is completed and the first external tool 10A is removed, when the control microprocessor 200 starts operating in Step S321 by power ON, the write-mode signal WM is temporarily read in Step S322. Then, based on the determination "NO" in Step S324 and the subsequent determination "YES" in Step S327, the total control program TCPRG is started in Step S340 after Step S328. Then, the input/output control is performed in Step S341.

In a state in which the power switch 92 is closed, the processing proceeds from Step S342 to the operation termination step S330 in a periodic manner. Then, the operation start step S321, Steps S322, S324, S327, S328, S340, S430, S341, and S342, and the operation termination step S330 are repeatedly executed.

However, when the power switch 92 is opened, it is determined as NO in Step S342, and hence the processing escapes from the circulation loop. After Step S344 or S345 is executed, the power relay Ry is de-energized.

When the power switch 92 is closed again so that the control microprocessor 200 starts operating, the initial setting data CDAT stored in the data memory 205 is read out and transferred to the RAM memory 203 in Step S341. Then, learning correction is performed on a part of the initial setting data CDAT during the operation of the electronic controller 20A.

(3) Essential Points and Features of First Embodiment

As is apparent from the description given above, the "electronic control apparatus to be connected to a program tool" according to the first embodiment of the present invention has the following features in relation with the invention recited in claim 1 of this application.

The "electronic control apparatus to be connected to a program tool" 30A according to the first embodiment of the present invention includes: the electronic controller 20A including the control microprocessor 200 for controlling driving of the electric load 70 externally connected through the output interface circuit 207 in accordance with an operating state of the sensor 60 externally connected through the input interface circuit 206 and a content of the input/output main control program CPROG which is a part of the total control program TCPRG stored in the electrically readable and writable non-volatile program memory 204A; and the first external tool 10A including: the source memory 104A having the total control program TCPRG written therein; and the transfer microprocessor 100 for transferring and writing the total control program TCPRG to the program memory 204A, the electronic controller 20A and the first external tool 10A being serially connected to each other. The serial connection uses the local area network (LAN) transceiver 1100 in which the master-station driver 110 and the master-station receiver 111 of the first external tool 10A and the slave-station receiver 211 and the slave-station driver 210 of the electronic controller 20A are connected to each other by the pair of communication lines LANH and LANN. The pair of communication lines LANH and LANN are each a general-purpose communication line which is serially connectable to at least the second external tool 10C replacing the first external tool 10A. The control microprocessor 200 further includes: the RAM memory 203 for computation processing; the non-volatile boot program memory 201, which is a part of an area of the program memory 204A or is connected after division; and the non-volatile data memory 205 for storing one of a control constant to be variably set and a control constant including a part of a control program, the non-volatile data memory 205 being a part of an area of the program memory 204A or being connected after division.

The boot program memory 201 stores in advance the transfer control program TPRG for transferring and writing the total control program TCPRG through the LAN transceiver 1100. The first external tool 10A further includes: the control power supply 108 for supplying the control voltage Vcc to the master-station driver 110 and the master-station receiver 111; and the high-voltage power supply 109 for supplying the high voltage Vaa to at least one of the pair of communication lines LANH and LANN in accordance with the switching signal MOD generated by the first external tool 10A before the total control program TCPRG is transferred. The high voltage Vaa is higher than the control voltage Vcc and equal to or lower than a withstanding voltage at which the LAN transceiver 1100 operates normally. When the total control program TCPRG is transferred from the first external tool 10A to be written to the electronic controller 20A, the high voltage Vaa is applied to one of the pair of communication lines LANH and LANN at least until the control microprocessor 200 recognizes the program write mode. The electronic controller 20A further includes the comparison circuit 212A for determining whether or not the signal voltage transmitted by the communication lines LANH and LANN exceeds at least the control voltage Vcc.

When the comparison circuit 212A detects a high voltage exceeding the control voltage Vcc, the write-mode signal WM is generated by the write-mode determination circuit 218A while the control microprocessor 200 is initialized to be restarted by the reset-pulse generation circuit 219, and the restarted control microprocessor 200 recognizes a write mode based on the write-mode signal WM and receives the total control program TCPRG transmitted from the first external tool 10A by referring to the boot program memory 201 to transfer the total control program TCPRG to be stored in the program memory 204A or the program memory 204A and the data memory 205. The high-voltage power supply 109 is blocked or excluded with respect to the second external tool 10C, and the second external tool 10C writes the control constant to the data memory 205 based on a content of the telecommunication control program TPRGU which is another part of the total control program TCPRG.

Further, the electronic control apparatus according to this embodiment has the following features in relation with the invention recited in claim 2 of this application.

The total control program TCPRG to be transferred and written to the program memory 204A of the electronic controller 20A by the first external tool 10A further includes the temporary setting data CDAT0 for a variable control constant associated with the input/output main control program CPROG. The first external tool 10A includes the source memory 105 which stores the initial setting data CDAT to be used as the control constant, and the transfer microprocessor 100 and the control microprocessor 200 cooperate with each other to transfer at least part of the initial setting data CDAT to the data memory 205 by using the telecommunication control program TPRGU. The electronic controller 20A performs input/output control based on the initial setting data CDAT and the input/output main control program CPROG when the initial setting data CDAT is stored in the data memory 205, and performs the input/output control based on the temporary setting data CDAT0 and the input/output main control program CPROG when the initial setting data CDAT is not stored in the data memory 205. The temporary setting data CDAT0 has a predetermined value between an upper limit value and a lower limit value of the variable control constant to be stored as the initial setting data CDAT.

As described above, in relation to claim 2 of the present invention, in the first external tool used in the manufacture and shipping stage of the electronic control apparatus, the temporary setting data CDAT0 at least for the variable control constant is stored in the program memory as a part of the total control program TCPRG in addition to the input/output main control program CPROG. When the variable control constant is known, the variable control constant may be transferred to the data memory as the initial setting data CDAT.

In general, a part of the variable control constants is determined in the stage in which the specifications of the sensor and the electric load to be used are determined after the shipping of the electronic control apparatus. At this point of time, the variable control constant is written in the data memory as the initial setting data CDAT. For the integrated component whose variable control constant is known at the time of shipping, the variable control constant can be stored as the initial setting data CDAT. Therefore, the present invention has a feature in that the degree of freedom in handling is improved.

Further, the electronic control apparatus according to this embodiment has the following features in relation with the invention recited in claim 4 of this application.

The master-station driver 110 and the slave-station driver 210 are brought into the dominant mode in which the logic level of the communication line LANH is "H" and the logic level of the communication line LANN is "L" in the case of the dominant logic in which the transmission logic signal TXD is at the logic level of one of "L" and "H". The master-station driver 110 and the slave-station driver 210 are brought into the recessive mode in which the logic levels of both the communication lines LANH and LANN are in a floating state at an intermediate potential of the power supply voltage in the case of the recessive logic in which the transmission logic signal TXD is at an inverted logic level of another of "H" and "L". The high voltage Vaa is directly applied to the communication line LANH through the high-voltage power switch 109A including the backflow prevention diode from the high-voltage power supply 109A when the switching signal MOD is generated, and the transmission logic signal TXD for the master-station driver 110 and the slave-station driver 210 is set to one of the recessive logic and the dominant logic, or the high voltage Vaa is directly applied to the communication line LANN through the high-voltage power switch 109A including the backflow prevention diode from the high-voltage power supply 109 when the switching signal MOD is generated, and the transmission logic signal TXD for the master-station driver 110 and the slave-station driver 210 is set to the recessive logic. The comparison circuit 212A monitors a signal voltage of one of the communication lines LANH and LANN to which the high voltage Vaa is applied.

As described above, in relation to claim 4 of the present invention, the high voltage Vaa for notifying the write mode is directly applied to any one of the pair of communication lines LANH and LANN.

Therefore, the present invention has a feature in that when the high voltage Vaa is set in advance to be applied to the communication line LANH, the transmission logic signal TXD for the master-station driver and the slave-station driver may be at any one of the dominant logic and the recessive logic. On the other hand, when the high voltage Vaa is applied to the communication line LANN, the transmission logic signal TXD for the master-station driver and the slave-station driver only needs to be set to the recessive logic.

Further, the electronic control apparatus according to this embodiment has the following features in relation with the invention recited in claim 6 of this application.

In a state in which the first external tool 10A and the electronic controller 20A are serially connected, when a write mode is set by the operation key 106 of the first external tool 10A, the transfer microprocessor 100 generates the switching signal MOD to perform switching connection so that a signal voltage to be applied to one of the communication lines LANH and LANN becomes the high voltage Vaa during a predetermined set time period. The predetermined set time period is set equal to or longer than a time period required for the electronic controller 20A to recognize the write mode by the comparison circuit 212A to initialize and restart the control microprocessor 200. The electronic controller 20A starts transmitting and receiving serial signal information when the comparison circuit 212A for determining a received signal voltage level determines that the signal voltage is based on the control voltage Vcc.

As described above, in relation to claim 6 of the present invention, after the recognition of the write mode in the electronic controller is completed and the signal voltage of the communication line is switched from the high voltage Vaa to the control voltage Vcc, the intercommunication of the serial signal between the first external tool and the electronic controller is started.

Therefore, the present invention has a feature in that the electronic controller does not require a high-voltage power supply for driving the LAN transceiver and hence the small and inexpensive electronic control apparatus is obtained.

Further, the electronic control apparatus according to this embodiment has the following features in relation with the invention recited in claim 7 of this application.

The comparison circuit 212A generates a determination logic signal CMP in accordance with reception of the high voltage Vaa, and the write-mode determination circuit 218A generates the write-mode signal WM based on generation of the determination logic signal CMP over a predetermined duration time period or longer. The predetermined duration time period is equal to or longer than a time period required for the LAN transceiver to transmit data of one frame.

As described above, in relation to claim 7 of the present invention, the write-mode determination circuit generates the write-mode signal WM based on the generation of the determination logic signal of the comparison circuit over the predetermined duration time period or longer.

Therefore, the present invention has a feature in that the possibility of erroneous stop of the operation of the electronic controller due to a noise signal induced by the communication line LANH or LANN is reduced during the actual operation of the electronic controller.

The predetermined duration time period is remarkably long as compared with a time period obtained with a common noise filter. Therefore, the generation of the determination logic signal is delayed. However, the delay time is generated only once at the start of the program transfer/write operation. Therefore, there is practically no problem. Thus, sufficient time to prevent the erroneous operation due to noise can be ensured.

Further, the electronic control apparatus according to this embodiment has the following features in relation with the invention recited in claim 9 of this application.

The high voltage Vaa which is an output voltage of the high-voltage power supply 109 provided in the first external tool 10A is higher than the DC drive voltage Vbb for feeding power to drive the electronic controller 20A. The control microprocessor 200, and the slave-station driver 210 and the slave-station receiver 211 are fed with power by a predetermined stabilizing power supply obtained by lowering the DC drive voltage Vbb.

As described above, in relation to claim 9 of the present invention, the high voltage Vaa provided to determine the write mode is set higher than the drive voltage Vbb for feeding power to drive the electronic controller.

Therefore, the present invention has a feature in that the write mode is not erroneously selected when a power line and the serial communication line come into contact with each other during the actual operation of the electronic controller.

Further, the electronic control apparatus according to this embodiment has the following features in relation with the invention recited in claim 10 of this application.

The comparison circuit 212A compares a first input signal voltage obtained by reducing the signal voltage of one of the communication lines LANH and LANN applied with the high voltage Vaa by the voltage-dividing resistors 213 and 214 and a second input signal voltage which is a predetermined output voltage output by a reference voltage source 217A, and generates a determination logic signal CMP corresponding to a write mode when the signal voltage of the one of the communication lines LANH and LANN exceeds the control voltage Vcc. A power-supply voltage of the comparison circuit 212A is the control voltage Vcc generated by the control power supply 208 provided to the electronic controller 20A.

As described above, in relation to claim 10 of the present invention, the reduced voltage obtained by dividing the signal voltage of the serial communication circuit is input to the comparison circuit included in the electronic controller.

Therefore, the present invention has a feature in that a high-voltage power supply is not required as a power supply for driving the comparison circuit and hence the control power supply for driving the control microprocessor can be directly used.

Second Embodiment (1) Detailed Description of Configuration

Figure 5:
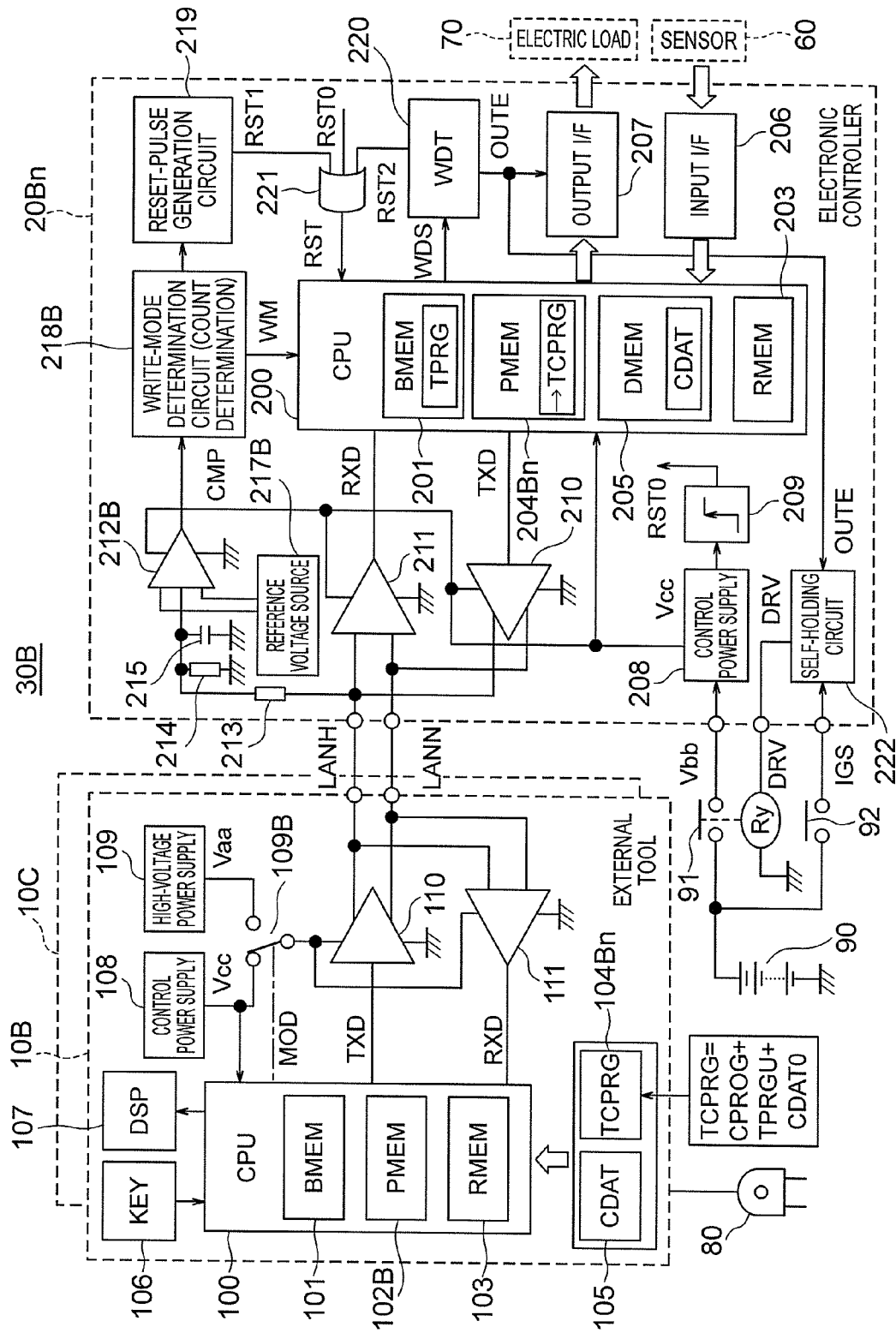
FIG. 5 is an overall block diagram of an electronic control apparatus to be connected to a program tool according to a second embodiment of the present invention.

In the following, an "electronic control apparatus to be connected to a program tool" according to a second embodiment of the present invention is described referring to FIG. 5 mainly for differences from FIG. 1. FIG. 5 is an overall block diagram of the "electronic control apparatus to be connected to a program tool".

In the drawings, like reference symbols denote like parts. Corresponding reference symbols in the first embodiment and the second embodiment are distinguished from each other by the capital letters "A" and "B".

FIG. 5 illustrates an electronic control apparatus 30B to be connected to a program tool, including a first external tool 10B and an electronic controller 20Bn as one of a plurality of types of electronic controllers 20Bn (n=1, 2, . . . ), which are connected to each other by communication lines LANH and LANN. The first external tool 10B is a program writing device, and is equipment in a manufacturing line provided in a shipping adjustment step of the electronic controller 20Bn. The electronic controller 20Bn is a product in an uncompleted state, which is sequentially transferred to a final shipping adjustment line. After a control program is written in the electronic controller 20Bn by the first external tool 10B, a performance test is conducted on the electronic controller 20Bn by using a sensor 60 and an electric load 70 which are connected in a simulated manner to the selected electronic controllers 20Bn.

The transfer microprocessor 100, which is a main constituent element of the first external tool 10B, is driven by power feeding with the control voltage Vcc to transfer a program described below to the electronic controller 20Bn in cooperation with the boot program memory 101, a tool-control program memory 102B, and the RAM memory 103.

The total control program TCPRG to be transferred to a program memory 204Bn of the electronic controller 20Bn is written in a source memory 104Bn which is, for example, a memory cassette. The initial setting data CDAT to be transferred to the data memory 205 of the electronic controller 20Bn is stored in the source memory 105, which is, for example, a memory cassette.

The LAN transceiver including the master-station driver 110 and the master-station receiver 111 which are provided in the first external tool 10B is as described above referring to FIG. 2.

A high-voltage power switch 109B, which operates intermittently in a predetermined cycle, is a transistor switch that operates in accordance with the switching signal MOD generated by the transfer microprocessor 100. When the high-voltage power switch 109B is actuated, a power-supply voltage of the master-station driver 110 and the master-station receiver 111 is switched from the control voltage Vcc at, for example, DC 5 V to be connected to the high voltage Vaa at DC 20 V.

The control microprocessor 200, which is a main constituent element of the electronic controller 20Bn, operates by using the control voltage Vcc generated by the control power supply 208 as a power supply. The control microprocessor 200 operates in accordance with the operating state of the sensor 60 as inspection equipment connected through the input interface circuit 206 so as to be able to control the driving of the electric load 70 as inspection equipment connected through the output interface circuit 207.

The boot program memory 201 is a part of an area of the program memory 204Bn described later, which is, for example, a flash memory, or a ROM memory which is connected after division. In the boot program memory 201, the transfer control program TPRG for allowing the first external tool 10B and the electronic controller 20Bn to transfer the total control program TCPRG from the source memory 104Bn to the program memory 204Bn based on a predetermined LAN communication protocol is stored.

The program memory 204Bn is, for example, a non-volatile flash memory which is erasable at a time in a block unit. The total control program TCPRG is transferred from the source memory 104Bn so as to be stored in the program memory 204Bn.

The data memory 205 is a part of the area of the program memory 204Bn described above, which is, for example, a flash memory, or an electrically readable and writable non-volatile memory which is connected after the division. The initial setting data CDAT is transferred from the source memory 105 so as to be stored in the data memory 205.

The slave-station receiver 211 and the slave-station driver 210, which are provided in the electronic controller 20Bn and operate by using the control voltage Vcc as a power-supply voltage, are connected to the first external tool 10B through the communication lines LANH and LANN. The reception logic signal RXD obtained from the slave-station receiver 211 is input to the control microprocessor 200. The transmission logic signal TXD generated by the control microprocessor 200 is transmitted to the first external tool 10B through the slave-station driver 210.

The voltage-dividing resistors 213 and 214 and the smoothing capacitor 215 divide the voltage between the communication line LANH and the ground circuit GND to input the divided voltage as a first input signal voltage to a monitoring input terminal of a comparison circuit 212B. The comparison circuit 212B constructs a band comparison circuit configured by the combination of a pair of comparators.

A reference voltage source 217B applies, for example, DC 2.4 V as a second input signal voltage and, for example, DV 2.6 V as a third input signal voltage to the comparison circuit 212B constructing the band comparison circuit.

Therefore, when the first input signal voltage is within a band of 2.4 V to 2.6 V, the logic level of the determination logic signal CMP which is an output signal of the comparison circuit 212B becomes "H". On the other hand, when the first input signal voltage is lower than 2.4 V or higher than 2.6 V, the logic level of the determination logic signal CMP becomes "L".

On the other hand, a voltage-dividing ratio by the voltage-dividing resistors 213 and 214 is, for example, 1/8. When the high voltage Vaa=20 V is applied to the communication line LANH, the first input signal voltage becomes 2.5 V. Therefore, the comparison circuit 212B operates reliably, and hence the logic level of the determination logic signal CMP becomes "H".

When the signal voltage Vcc of the communication line LANH is 5 V, however, the first input signal voltage after the voltage division is 0.6 V. Therefore, the non-operation of the comparison circuit 212B becomes reliable, and hence the logic level of the determination logic signal CMP becomes "L".

In the case where the communication line LANH comes into contact with a positive wiring of the external power supply 90 during the actual operation of the electronic controller 20Bn and the drive voltage Vbb is from 12 V to 16 V at the time of contact, the first input signal voltage becomes 1.5 V to 2.0 V. Therefore, the logic level of the determination logic signal CMP does not become "H".

The comparison circuit 212B operates in accordance with the intermittent operation of the high-voltage power switch 109B which operates intermittently in a predetermined cycle. As a result, the logic level of the determination logic signal CMP changes. A write-mode determination circuit 218B which operates in accordance with the logic level of the determination logic signal CMP generates the write-mode signal WM when the determination logic signal CMP changes its logic level for a predetermined number of times within a predetermined time period.

During a time period in which the power supply of the master-station driver 110 is intermittently switched by the switching signal MOD, the transmission logic signal TXD of the master-station driver 110 is maintained at the dominant logic level and the transmission logic signal TXD of the slave-station driver 210 may be at anyone of the dominant logic and the recessive logic.

Other configurations are the same as those described in the first embodiment, and therefore the detailed description thereof is herein omitted.

(2) Detailed Description of Functions and Operation

Figure 6:
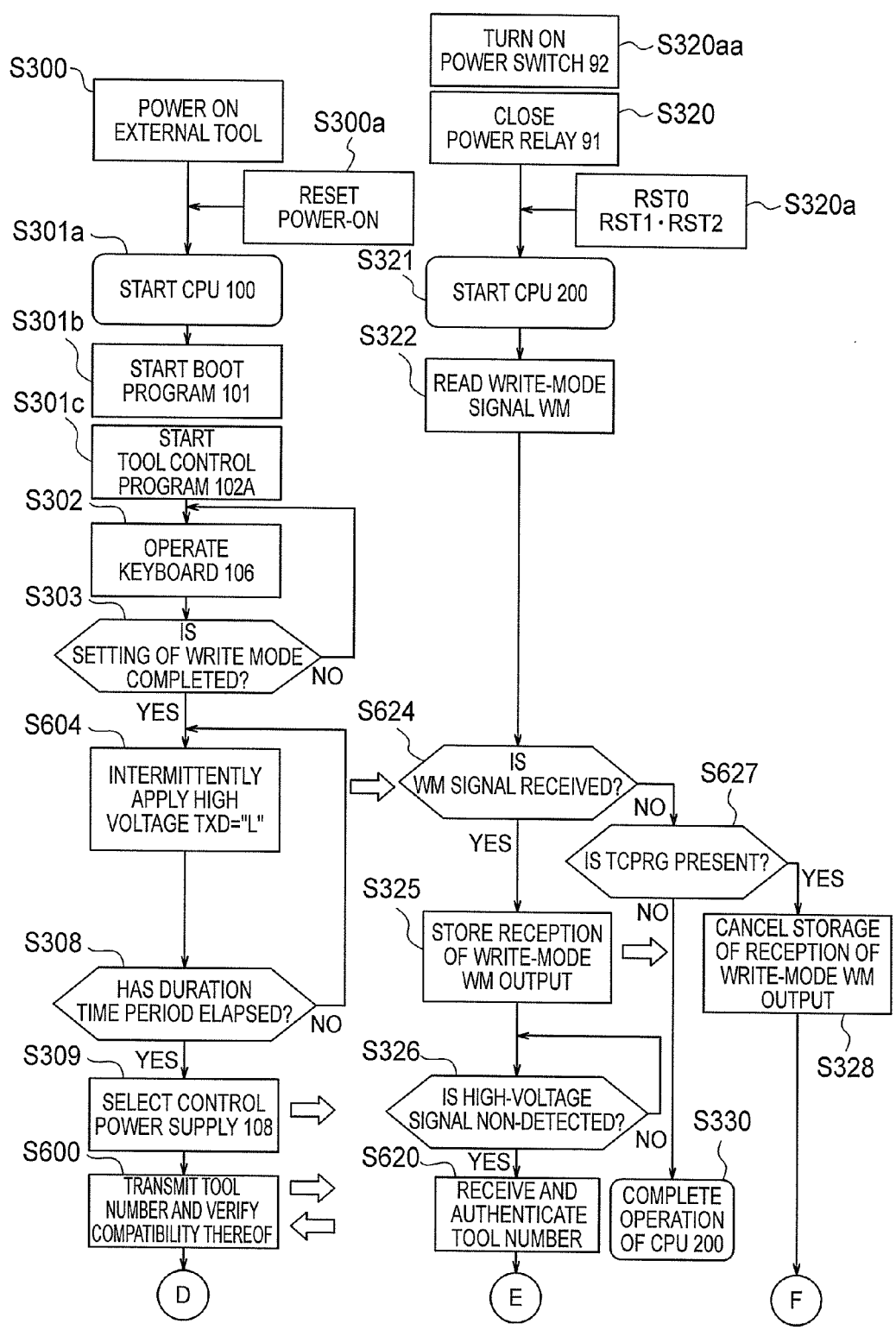
FIG. 6 is a flowchart illustrating a first half of a control operation of the electronic control apparatus to be connected to the program tool illustrated in FIG. 5.

In the following, functions and operation are described in detail referring to FIGS. 6 and 7 mainly for differences from FIGS. 4 and 5. FIG. 6 is a flowchart illustrating a first half of a control operation of the electronic control apparatus to be connected to the program tool illustrated in FIG. 5, and FIG. 7 is a flowchart illustrating a second half of the control operation.

Figure 7:
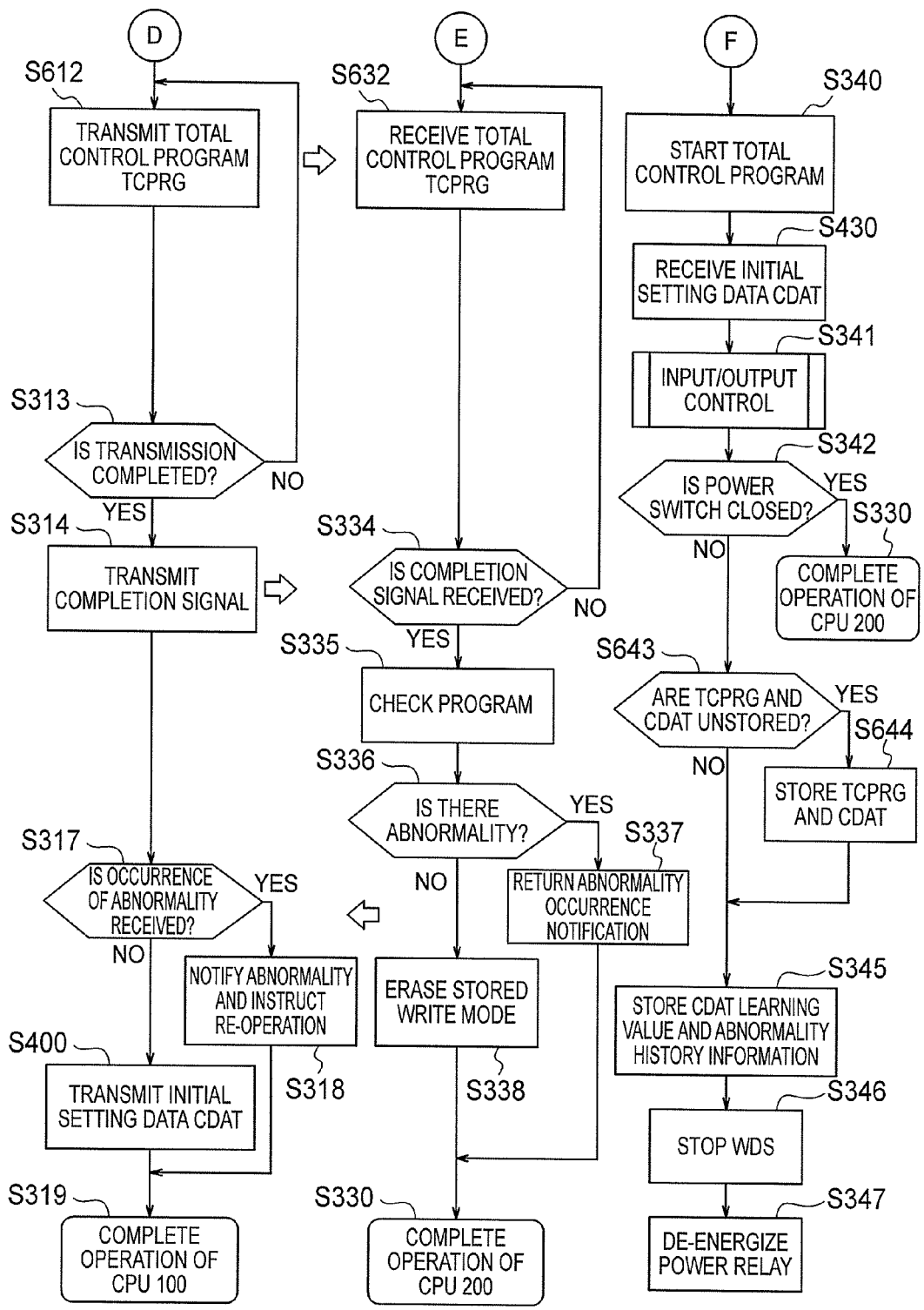
FIG. 7 is a flowchart illustrating a second half of the control operation of the electronic control apparatus to be connected to the program tool illustrated in FIG. 5.

In FIGS. 6 and 7, the steps denoted by the same reference symbols (in S300s and S400s) are the same as those illustrated in FIGS. 4 and 5, and different steps are denoted by the reference symbols S600s.

First, in FIG. 6, in Step S604 executed after the determination "YES" is made in Step S303 on the side of the first external tool 10B, the logic level of the transmission logic signal TXD of the master-station driver 110 is set to "L" (dominant logic). By intermittently generating the switching signal MOD, the level of the application voltage to the communication line LANH is alternately switched between the high voltage Vaa and the control voltage Vcc.

In the electronic controller 20Bn, a value of the first input signal voltage input from the communication line LANH and values of the second input signal voltage and the third input signal voltage generated by the reference voltage source 217B are compared with each other by the comparison circuit 212B. When the first input signal voltage is within a predetermined voltage range, the determination logic signal CMP is generated. Based on the detection of the determination logic signal CMP for a predetermined number of times within a predetermined time period by the write-mode determination circuit 218B, the write-mode signal WM is generated.

In Step S624 subsequent to Step S322, whether or not the write-mode signal WM is generated is determined. When the write-mode signal WM is not generated, it is determined as NO and the processing proceeds to Step S627. On the other hand, when the write-mode signal WM is generated, it is determined as YES and the processing proceeds to Step S325.

In Step S627, whether or not the total control program TCPRG is stored in the program memory 204Bn in Step S644 described later referring to FIG. 7 is determined. When the total control program TCPRG is already written and stored, it is determined as YES and the processing proceeds to Step S328. On the other hand, when the total control program TCPRG is not written yet, it is determined as NO and the processing proceeds to the operation termination step S330.

In Step S600 subsequent to Step S309, a tool number of the first external tool 10B corresponding to the kind of the electronic controller 20Bn is transmitted. The electronic controller 20Bn receives the tool number in Step S620 subsequent to Step S326 to authenticate compatibility of the tool number and make a reply. After the first external tool 10B verifies the compatibility, the processing proceeds to Step S612 illustrated in FIG. 7.

After Step S620, the processing proceeds to Step S632 illustrated in FIG. 7. On the other hand, after Step S328, the processing proceeds to Step S340 illustrated in FIG. 7.

In FIG. 7 following FIG. 6, in Step S612 executed subsequently to Step S600 described above, the total control program TCPRG stored in the source memory 104Bn of the first external tool 10B is transmitted. On the side of the electronic controller 20Bn, the total control program TCPRG transmitted in Step S612 is received based on the boot program stored in advance in the boot program memory 201 and is temporarily stored in the RAM memory 203. Thereafter, in Step S644 described later, the total control program TCPRG is transferred to a predetermined area of the program memory 204Bn.

The total control program TCPRG may be sequentially transferred to the program memory 204Bn in a unit of a plurality of bytes through the RAM memory 203 in Step S632.

In Step S643 subsequent to Step S342, when the power switch 92 is opened for the first time and the total control program TCPRG received in Step S632 and the initial setting data CDAT received in Step S430 are not transferred to be stored in the program memory 204Bn or the data memory 205, it is determined as YES. Then, the processing proceeds to Step S644. On the other hand, when the power switch 92 is interrupted again after the completion of the transfer and storage, it is determined as NO. Then, the processing proceeds to Step S345.

In Step S644, the total control program TCPRG, which is received in Step S632 and is written in the RAM memory 203, is transferred to a predetermined address in the program memory 204Bn so as to be stored therein. The initial setting data CDAT, which is received in Step S430 and is written in the RAM memory 203, is transferred to a predetermined address in the data memory 205 so as to be stored therein.

In an actual operation state in which the transfer of the program to the program memory 204Bn is completed and the first external tool 10B is removed, the control microprocessor 200 starts operating in Step S321 by power ON. In Step S322, the write-mode signal WM is read out. When it is determined as NO in Step S624 and it is then determined as YES in Step S627, the total control program TCPRG is started in Step S340 following Step S328. Then, in Step S430, the initial setting data CDAT is received. In Step S341, the input/output control is executed.

In a state in which the power switch 92 is closed, the processing periodically proceeds from Step S342 to the operation termination step S330. Then, the operation start step S321, Steps S322, S624, S627, S328, S340, S430, S341, and S342, and the operation termination step S330 are repeatedly executed.

However, when the power switch 92 is opened, it is determined as NO in Step S342. Then, the processing escapes from the circulation loop. After Step S644 or S345 is executed, the power relay Ry is de-energized.

In the description given above, as means for applying the high voltage Vaa to the communication line LANH, a direct-application method is used in FIG. 1 and a power-supply switching method is used in FIG. 5.

As means for reliably determining the write mode, a delay determination method is used in FIG. 1 and an intermittent driving method is used in FIG. 5.

As means for comparing and determining the high voltage Vaa, a magnitude determination method based on the simple voltage-division detection is used in FIG. 1 and a band comparison method is used in FIG. 5.

However, the above-mentioned methods may be appropriately selected and combined. In addition, the communication line LANH to which the high voltage is applied may be replaced by the communication line LANN.

(3) Essential Points and Features of Second Embodiment

As is apparent from the description given above, the "electronic control apparatus to be connected to a program tool" according to the second embodiment of the present invention has the following features in relation with the invention recited in claim 1 of this application.

The "electronic control apparatus to be connected to a program tool" 30B according to the second embodiment of the present invention includes: the electronic controller 20Bn including the control microprocessor 200 for controlling driving of the electric load 70 externally connected through the output interface circuit 207 in accordance with an operating state of the sensor 60 externally connected through the input interface circuit 206 and a content of the input/output main control program CPROG which is a part of the total control program TCPRG stored in the electrically readable and writable non-volatile program memory 204Bn; and the first external tool 10B including: the source memory 104Bn having the total control program TCPRG written therein; and the transfer microprocessor 100 for transferring and writing the total control program TCPRG to the program memory 204Bn, the electronic controller 20Bn and the first external tool 10B being serially connected to each other. The serial connection uses the local area network (LAN) transceiver 1100 in which the master-station driver 110 and the master-station receiver 111 of the first external tool 10B and the slave-station receiver 211 and the slave-station driver 210 of the electronic controller 20Bn are connected to each other by the pair of communication lines LANH and LANN. The pair of communication lines LANH and LANN are each a general-purpose communication line which is serially connectable to at least the second external tool 10C replacing the first external tool 10B. The control microprocessor 200 further includes: the RAM memory 203 for computation processing; the non-volatile boot program memory 201, which is a part of an area of the program memory 204Bn or is connected after division; and the non-volatile data memory 205 for storing one of a control constant to be variably set and a control constant including a part of a control program, the non-volatile data memory 205 being a part of an area of the program memory 204Bn or being connected after division.

The boot program memory 201 stores in advance the transfer control program TPRG for transferring and writing the total control program TCPRG through the LAN transceiver 1100. The first external tool 10B further includes: the control power supply 108 for supplying the control voltage Vcc to the master-station driver 110 and the master-station receiver 111; and the high-voltage power supply 109 for supplying the high voltage Vaa to at least one of the pair of communication lines LANH and LANN in accordance with the switching signal MOD generated by the first external tool 10B before the total control program TCPRG is transferred. The high voltage Vaa is higher than the control voltage Vcc and equal to or lower than the withstanding voltage at which the LAN transceiver 1100 operates normally. When the total control program TCPRG is transferred from the first external tool 10B to the electronic controller 20Bn to be written therein, the high voltage Vaa is applied to one of the communication lines LANH and LANN at least until the control microprocessor 200 recognizes the program write mode. The electronic controller 20Bn includes the comparison circuit 212B for determining whether or not the signal voltage transmitted by the communication lines LANH and LANN exceeds at least the control voltage Vcc.

When the comparison circuit 212B detects a high voltage exceeding the control voltage Vcc, the write-mode signal WM is generated by the write-mode determination circuit 218A or 218B. In addition, the control microprocessor 200 is initialized to be restarted by the reset-pulse generation circuit 219. The restarted control microprocessor 200 recognizes the write mode based on the write-mode signal WM, and receives the total control program TCPRG transmitted from the first external tool 10B by referring to the boot program memory 201 to transfer the total control program TCPRG to be stored in the program memory 204Bn or the program memory 204Bn and the data memory 205. The second external tool 10C is blocked or excluded with respect to the high-voltage power supply 109, and the second external tool 10C writes the control constant to the data memory 205 based on the content of the telecommunication control program TPRGU which is another part of the total control program TCPRG.

Further, the electronic control apparatus according to this embodiment has the following features in relation with the invention recited in claim 2 of this application.

The total control program TCPRG to be transferred and written to the program memory 204Bn of the electronic controller 20Bn by the first external tool 10B further includes the temporary setting data CDAT0 for a variable control constant associated with the input/output main control program CPROG. The first external tool 10B includes the source memory 105 which stores the initial setting data CDAT to be used as the control constant, and the transfer microprocessor 100 and the control microprocessor 200 cooperate with each other to transfer at least part of the initial setting data CDAT to the data memory 205 by using the telecommunication control program TPRGU. The electronic controller 20Bn performs input/output control based on the initial setting data CDAT and the input/output main control program CPROG when the initial setting data CDAT is stored in the data memory 205, and performs the input/output control based on the temporary setting data CDAT0 and the input/output main control program CPROG when the initial setting data CDAT is not stored in the data memory 205. The temporary setting data CDAT0 has a predetermined value between an upper limit value and a lower limit value of the variable control constant to be stored as the initial setting data CDAT.

As described above, in relation to claim 2 of the present invention, in the first external tool used in the manufacture and shipping stage of the electronic control apparatus, in addition to the input/output main control program CPROG, the temporary setting data CDAT0 at least for the variable control constant is stored in the program memory as a part of the total control program TCPRG. When the variable control constant is known, the variable control constant can also be transferred to the data memory as the initial setting data CDAT.

In general, a part of the variable control constants is determined in a stage in which the specifications of the sensor and the electric load to be used are determined after the shipping of the electronic control apparatus. At this point of time, the variable control constant is written in the data memory as the initial setting data CDAT. For the integrated component whose variable control constant is known at the time of shipping, the variable control constant can be stored as the initial setting data CDAT. Therefore, the present invention has a feature in that the degree of freedom in handling is improved.

The same is applied to an electronic control apparatus described later in a third embodiment of the present invention.

Further, the electronic control apparatus according to this embodiment has the following features in relation with the invention recited in claim 3 of this application.

One of the boot program memory 201 and the program memory 204Bn of the electronic controller 20Bn stores machine-type code information. The first external tool 10B further includes the tool control program memory 102B to cooperate with the transfer microprocessor 100. The tool control program memory 102B contains the tool control program including the principal control program irrelevant to the machine type of the electronic controller 20Bn to be used and the individual control program corresponding to the machine type. The transfer microprocessor 100 executes the principal control program and the individual control program corresponding to the machine type based on the machine-type code information transmitted from the electronic controller 20Bn. The first external tool 10B is applied to write the total control program TCPRG to the plurality of types of the electronic controllers 20Bn.

As described above, in relation to claim 3 of the present invention, the first external tool is used in common among various electronic controllers such as an engine controller, a transmission controller, and a brake controller, which are in-vehicle electronic controllers. The common use of the first external tool can be readily achieved by the intercommunication between the first external tool and the various electronic controllers with the use of a general-purpose LAN protocol.

The same is applied to the electronic control apparatus described later in the third embodiment of the present invention.

Further, the electronic control apparatus according to this embodiment has the following features in relation with the invention recited in claim 5 of this application.

The master-station driver 110 and the slave-station driver 210 are brought into the dominant mode in which the logic level of the communication line LANH is "H" and the logic level of the communication line LANN is "L" in the case of the dominant logic in which the transmission logic signal TXD is at the logic level of one of "L" and "H". The master-station driver 110 and the slave-station driver 210 are brought into the recessive mode in which the logic levels of both the communication lines LANH and LANN are in a floating state at an intermediate potential of the power-supply voltage in the case of the recessive logic in which the transmission logic signal TXD is at the inverted logic level of another of "H" and "L". When the switching signal MOD is generated to notify the write mode, the high voltage Vaa is applied as the power-supply voltage of the master-station driver 110 through the high-voltage power switch 109B, whereas when the write mode is cancelled, the power-supply voltage of the master-station driver 110 is connected again to the control voltage Vcc, and the transmission logic signal TXD of the master-station driver 110 is set to the dominant logic during the write-mode time period, whereas the transmission logic signal TXD of the slave-station driver 210 is settable to any one of the recessive logic and the dominant logic, which results in the logic level of the communication line LANH set to "H" and the logic level of the communication line LANN set to "L". The comparison circuit 212B monitors one of the signal voltage of the communication line LANH, which is generated by the high voltage Vaa, and the differential voltage between the signal voltages of the communication lines LANH and LANN.

As described above, in relation to claim 5 of the present invention, the high voltage Vaa for notifying the write mode is applied as the power-supply voltage of the master-station driver. By monitoring the signal voltage of the communication line LANH, which is generated by the high voltage Vaa, or the differential voltage between the signal voltages of the communication lines LANH and LANN, the write mode is determined.

Therefore, the present invention has a feature in that when the differential voltage is monitored, the effects of noise entering the communication lines are reduced, and when only the voltage of the communication line LANH is monitored, the comparison circuit is simplified.

Further, the electronic control apparatus according to this embodiment has the following features in relation with the invention recited in claim 6 of this application.

In a state in which the first external tool 10B and the electronic controller 20Bn are serially connected, when a write mode is set by the operation key 106 of the first external tool 10B, the transfer microprocessor 100 generates the switching signal MOD to perform switching connection so that a signal voltage to be applied to one of the communication lines LANH and LANN becomes the high voltage Vaa during a predetermined set time period. The predetermined set time period is set equal to or longer than a time period required for the electronic controller 20Bn to recognize the write mode by the comparison circuit 212B to initialize and restart the control microprocessor 200. The electronic controller 20Bn starts transmitting and receiving serial signal information when the comparison circuit 212B for determining a received signal voltage level determines that the signal voltage is based on the control voltage Vcc.

As described above, in relation to claim 6 of the present invention, after the recognition of the write mode is completed in the electronic controller and the signal voltage of the communication line is switched from the high voltage Vaa to the control voltage Vcc, the intercommunication of the serial signal between the first external tool and the electronic controller is started.

Therefore, the present invention has a feature in that the high-voltage power supply for driving the LAN transceiver is not required for the electronic controller and hence the small and inexpensive electronic control apparatus is obtained.

The same is applied to the electronic control apparatus described later in the third embodiment of the present invention.

Further, the electronic control apparatus according to this embodiment has the following features in relation with the invention recited in claim 8 of this application.

The first external tool 10B intermittently applies the switching signal MOD in a predetermined cycle. The electronic controller 20Bn generates the determination logic signal CMP which performs an inverse operation in accordance with an intermittent operation of the high voltage Vaa by the comparison circuit 212B, and the write-mode determination circuit 218B generates the write-mode signal WM when the determination logic signal CMP is generated for a predetermined number of times within a predetermined time period.

As described above, in relation to claim 8 of the present invention, the first external tool intermittently applies the high voltage to the communication line so as to notify the write mode. The comparison circuit and the write-mode determination circuit included in the electronic controller determine the write mode based on the detection of the determination logic signal for the predetermined number of times within the predetermined time period.

Therefore, the present invention has a feature in that the possibility of erroneous stop of the operation of the electronic controller due to a noise signal induced by the communication lines LANH and LANN is reduced during the actual operation of the electronic controller.

Further, the electronic control apparatus according to this embodiment has the following features in relation with the invention recited in claim 9 of this application.

The high voltage Vaa which is an output voltage of the high-voltage power supply 109 provided in the first external tool 10B is higher than the DC drive voltage Vbb for feeding power to drive the electronic controller 20Bn. The control microprocessor 200, and the slave-station driver 210 and the slave-station receiver 211 are fed with power by a predetermined stabilizing power supply obtained by lowering the DC drive voltage Vbb.

As described above, in relation to claim 9 of the present invention, the high voltage Vaa provided to determine the write mode is higher than the drive voltage Vbb for feeding power to drive the electronic controller.

Therefore, the present invention has a feature in that the write mode is not erroneously selected when the power line and the serial communication line come into contact with each other during the actual operation of the electronic controller.

The same is applied to the electronic control apparatus described later in the third embodiment of the present invention.

Further, the electronic control apparatus according to this embodiment has the following features in relation with the invention recited in claim 11 of this application.

The comparison circuit 212B compares the first input signal voltage obtained by reducing the signal voltage of one of the communication lines LANH and LANN applied with the high voltage Vaa by the voltage-dividing resistors 213 and 214 and the second input signal voltage and the third input signal voltage which are predetermined output voltages output by the reference voltage source 217B, and generates the determination logic signal CMP corresponding to the write mode when the signal voltage of the one of the communication lines LANH and LANN is within a predetermined voltage band exceeding the control voltage Vcc. The power-supply voltage of the comparison circuit 212B is the control voltage Vcc generated by the control power supply 208 provided to the electronic controller 20Bn.

As described above, in relation to claim 11 of the present invention, the reduced voltage obtained by dividing the signal voltage of the serial communication line is input to the comparison circuit included in the electronic controller.

Therefore, the present invention has a feature in that the control power supply for driving the control microprocessor can be directly used as the power supply for driving the comparison circuit without requiring a high-voltage power supply.

Moreover, the present invention has a feature in that the determination of the write mode is made when the signal voltage of the communication line LANH or LANN is within the predetermined voltage band exceeding the predetermined control voltage Vcc and hence the possibility of erroneous determination of the write mode is reduced even when a different voltage comes into contact with the communication line.

Third Embodiment (1) Detailed Description of Configuration

In the following, a configuration of the "electronic control apparatus to be connected to a program tool" according to the third embodiment of the present invention is described in detail referring to FIG. 8 which is an overall block diagram of the electronic control apparatus.

Figure 8:
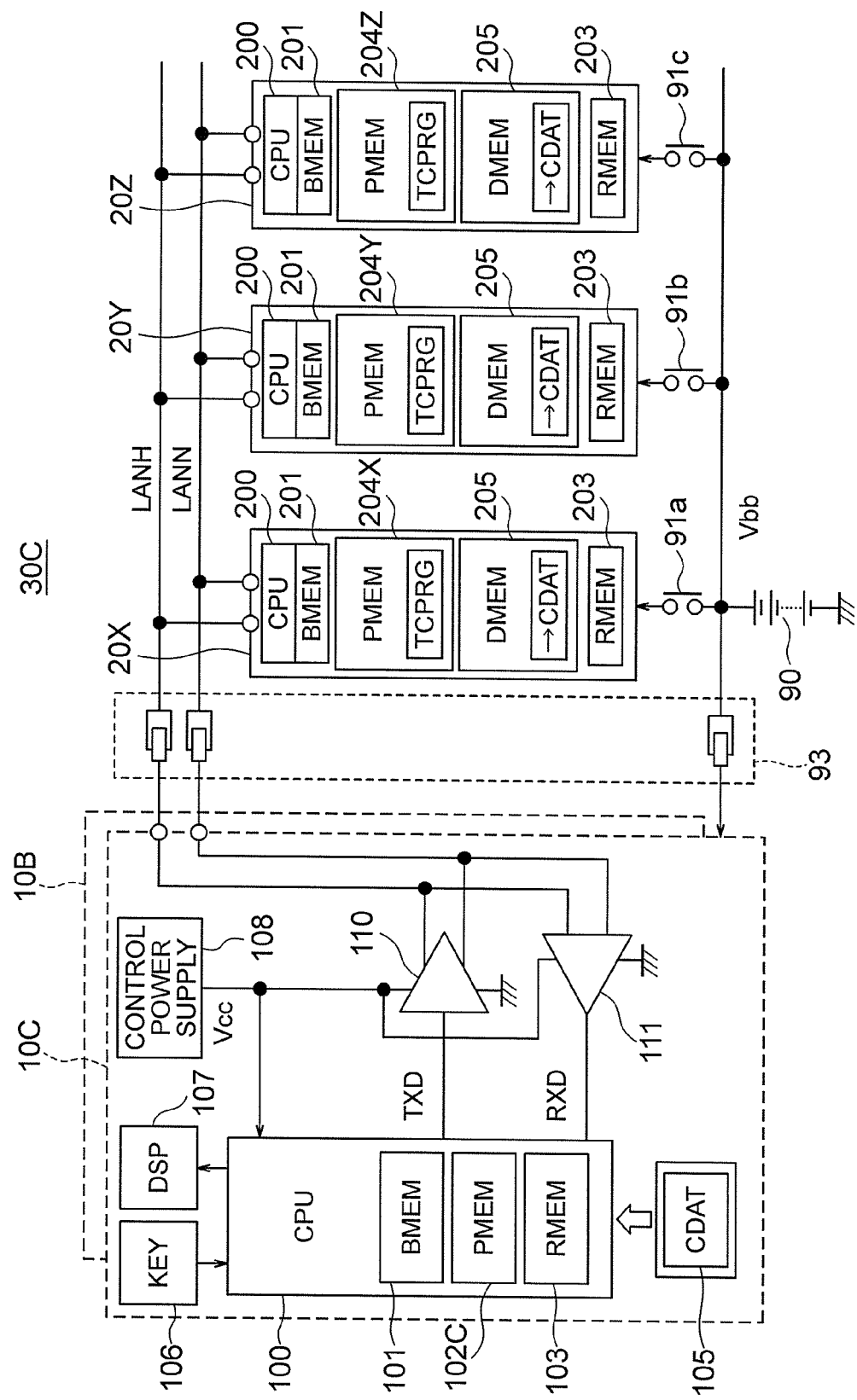
FIG. 8 is an overall block diagram of an electronic control apparatus to be connected to a program tool according to a third embodiment of the present invention.

In FIG. 8, an electronic control apparatus 30C to be connected to a program tool includes a plurality of electronic controllers 20X, 20Y, and 20Z. The plurality of electronic controllers 20X, 20Y, and 20Z are, for example, an engine controller, a transmission controller, and a brake controller, which are in-vehicle electronic controllers. The sensor 60 and the electric load 70 (both not shown) are connected to each of the electronic controllers 20X, 20Y, and 20Z. The sensor 60 and the electric load 70 are the same as those described in the first and second embodiments, and therefore the detailed description thereof is herein omitted.

The electronic controller 20X includes the control microprocessor 200, the boot program memory 201, a program memory 204X, the data memory 205, and the RAM memory 203 for computation processing. In the boot program memory 201, the transfer control program TPRG is stored in advance. The total control program TCPRG is stored by the first external tool 10B in the program memory 204X. The initial setting data CDAT is stored in the data memory 205. The electronic controllers 20Y and 20Z have the same configuration as described above except that program memories 204Y and 204Z are respectively included in place of the program memory 204X.

In FIG. 8, only a part of the internal configuration of the electronic controllers 20X, 20Y, and 20Z is illustrated for simplification of the drawing. However, the electronic controllers 20X, 20Y, and 20Z also include other constituent elements which are included in the electronic controller 20Bn illustrated in FIG. 5.

Each of the boot program memory 201, the program memories 204X, 204Y, and 204Z, and the data memory 205 is a single non-volatile memory or a non-volatile memory divided into a plurality of areas.

The total control program TCPRG includes the input/output main control program CPROG, the temporary setting data CDAT0, and the telecommunication control program TPRGU for transferring the initial setting data CDAT from the first external tool 10A or 10B or the second external tool 10C to the data memory 205.

The electronic controllers 20X, 20Y, and 20Z are supplied with the drive voltage Vbb from the external power supply 90 which is, for example, an in-vehicle battery respectively through output elements 91a, 91b, and 91c of power relays (not shown; see FIGS. 1 and 5).

The electronic controllers 20X, 20Y, and 20Z respectively include the LAN transceivers (not shown) serving as slave stations, and are connected to each other by the pair of communication lines LANH and LANN.

The second external tool 10C transfers and writes the initial setting data CDAT to the data memories 205 of the electronic controllers 20X, 20Y, and 20Z by using the operation key 106 and the display 107. Power is fed from the external power supply 90 to the second external tool 10C through a connector 93. The master-station driver 110 and the master-station receiver 111 included in the second external tool 10C are connected to the communication lines LANH and LANN.

Even when the electronic controllers 20X, 20Y, and 20Z already include the initial setting data CDAT, the initial setting data CDAT is written and changed by the second external tool 10C if the change is allowed.

The transfer microprocessor 100, which is a main constituent element of the second external tool 10C, is fed with power to be driven by the control voltage Vcc generated by the control power supply 108. The boot program memory 101, a tool control program memory 102C, and the RAM memory 103 cooperate with each other to transfer the initial setting data CDAT stored in the source memory 105 to the electronic controllers 20X, 20Y, and 20Z.

The master-station driver 110 and the master-station receiver 111 are driven by the control voltage Vcc. The high voltage Vaa to be applied to the communication lines LANH and LANN is not provided to the second external tool 10C.

The second external tool 10C can be connected to the electronic controller 20A or 20Bn as illustrated in FIGS. 1 and 5.

For actual component characteristics relating to characteristics of integrated components of the electronic controllers 20A, 20Bn, and 20X to 20Z among various types of the initial setting data CDAT stored in the data memory 205, write processing is simultaneously performed to write the total control program TCPRG to the program memory 204A or 204Bn or the program memories 204X to 204Z by the first external tool 10A or 10B. The write processing is shown in Step S400 illustrated in FIG. 4 and Step S430 illustrated in FIG. 7.

However, actual component characteristics of the sensor 60 or the electric load 70 used therewith are written and set in the data memory 205 by the second external tool 10C at the time when the sensor 60 and the electric load 70 are connected to the electronic controllers.

(2) Detailed Description of Functions and Operation

Figure 9:
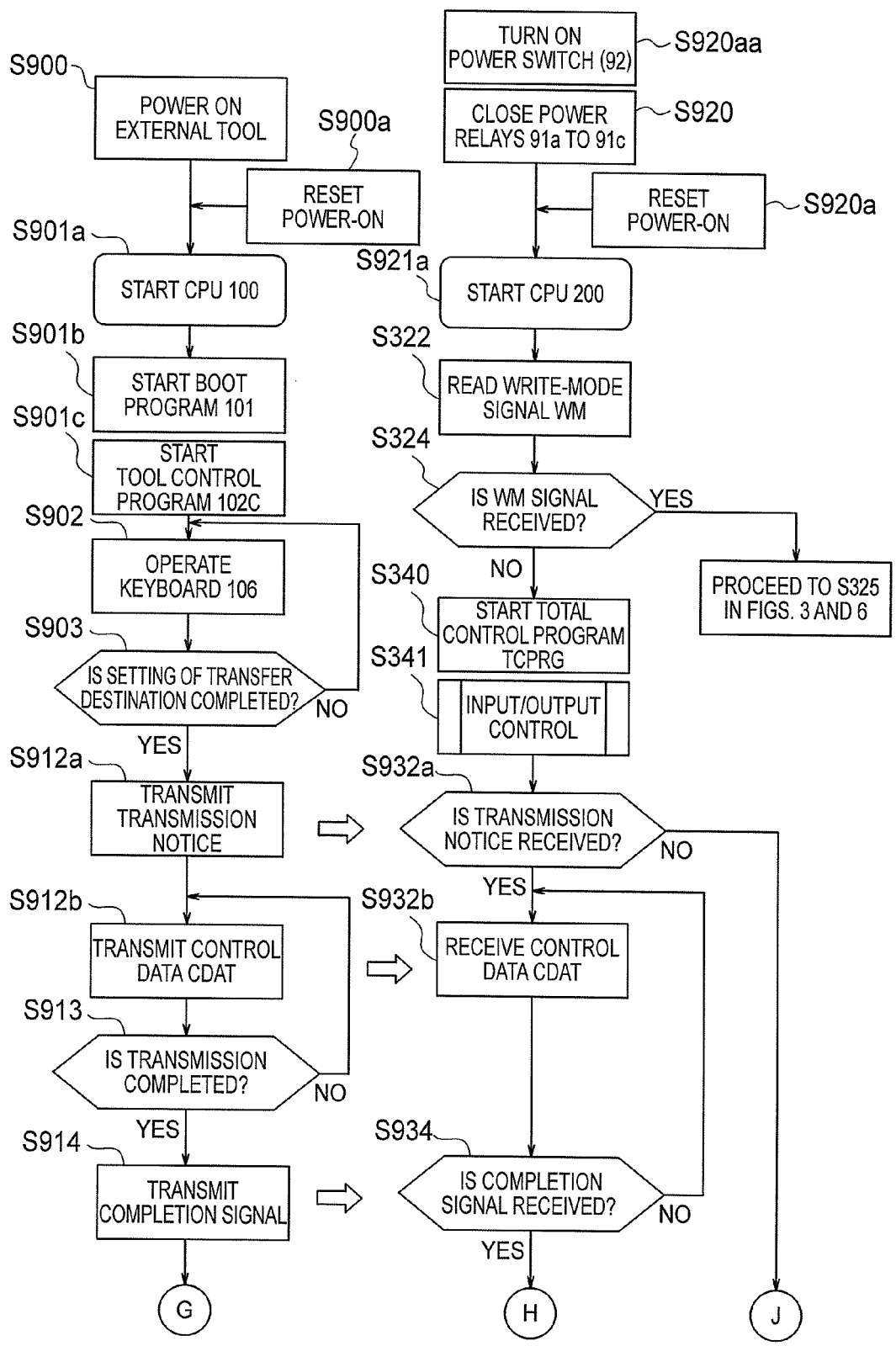
FIG. 9 is a flowchart illustrating a first half of a control operation of the electronic control apparatus to be connected to the program tool illustrated in FIG. 8.

In the following, functions and operation are described in detail referring to FIGS. 9 and 10. FIG. 9 is a flowchart illustrating a first half of a control operation of the electronic control apparatus to be connected to the program tool illustrated in FIG. 8, and FIG. 10 is a flowchart illustrating a second half of the control operation.

Figure 10:
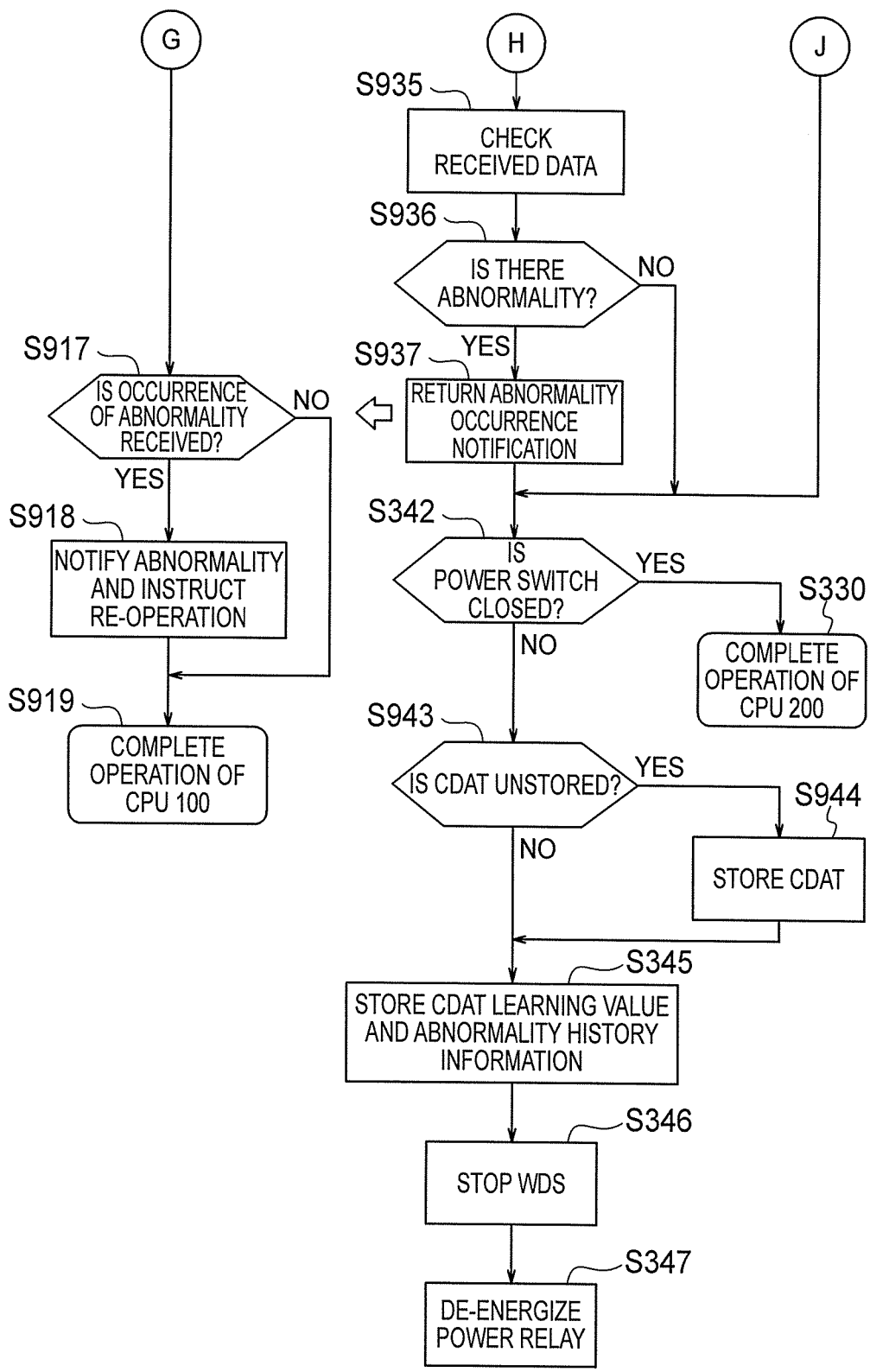
FIG. 10 is a flowchart illustrating a second half of the control operation of the electronic control apparatus to be connected to the program tool illustrated in FIG. 8.

Steps denoted by the reference symbols in S300s in FIGS. 9 and 10 correspond to the steps denoted by the same reference symbols in FIGS. 3 and 4.

First, in FIG. 9, in Step S900, the second external tool 10C is powered ON. Then, a power-ON reset circuit (not shown; see Step S900a) works to initialize the transfer microprocessor 100. In Step S901a, the transfer microprocessor 100 starts a transfer control operation for the initial setting data DCAT. In subsequent Step S901b, a boot program stored in the boot program memory 101 is first executed. When a tool control program is already written in the tool control program memory 102C, the processing immediately proceeds to Step S901c. Then, the tool control program from subsequent Step S902 to Step S919 illustrated in FIG. 10 is executed.

In Step S902, the operation information of the operation key 106 is read out. In subsequent Step S903, whether or not the key operation performed in Step S902 is for data of a transfer destination of the initial setting data CDAT is determined. When the input of the transfer destination is completed, it is determined as YES. Then, the processing proceeds to Step S912a. On the other hand, when the input of the transfer destination is not completed yet, it is determined as NO. Then, the processing returns to Step S902. Thereafter, the input of the transfer-destination data is waited for while the processing circulates through Steps S902 and S903.

In Step S912a, notice information for transmitting the initial setting data stored in the source memory 105 is transmitted to any one of the electronic controllers 20X, 20Y, and 20Z which is specified in Step S902.

On the other hand, when the power switch 92 (not shown; see FIGS. 1 and 5) is turned ON in Step S920aa, the output elements 91a, 91b, and 91c of the power relay Ry are closed in subsequent Step S920 so that the drive voltage Vbb is applied to the electronic controllers 20X, 20Y, and 20Z.

As a result, the power-ON reset circuit (not shown) works (see Step S920a) to initialize the control microprocessor 200. Then, in Step S921a, the control operation is started.

In subsequent Step S322, whether or not the write-mode determination circuit 218A or 218B (not shown; see FIGS. 1 and 5) generates the write-mode signal WM is readout. Then, the processing proceeds to Step S324.

In Step S324, when the write-mode signal WM is generated, it is determined as YES. Then, the processing proceeds to Step S325 illustrated in FIGS. 3 and 6. On the other hand, when the write-mode signal WM is not generated, it is determined as NO. Then, the processing proceeds to Step S340.

However, when the second external tool 10C is connected, the write-mode signal WM is not generated. Therefore, in such a case, it is not determined as YES in Step S324.

In Step S340, the total control program TCPRG received in Step S332 illustrated in FIG. 4 or in Step S632 illustrated in FIG. 7 is started.

In subsequent Step S341, the input/output control is executed by the input/output main control program CPROG contained in the total control program TCPRG started in Step S340.

In subsequent Step S932a, whether or not the transmission notice transmitted in Step S912a is received is determined by reading a flag memory (not shown). When the transmission notice is received, it is determined as YES. Then, the processing proceeds to Step S932b. When the transmission notice is not received or the second external tool 10C is not connected, it is determined as NO. Then, the processing proceeds to Step S940 illustrated in FIG. 10.

In the second external tool 10C, the processing proceeds from Step S921a to Step S912b. In Step S912b, the initial setting data CDAT stored in the source memory 105 is transmitted. In the electronic controllers 20X, 20Y, and 20Z, the initial setting data CDAT transmitted in Step S912b is received in Step S932b based on the telecommunication control program TPRGU contained in the total control program TCPRG started in Step S340. The received initial setting data CDAT is temporarily stored in the RAM memory 203. Thereafter, the initial setting data CDAT is transferred to the data memory 205 of a target one of the electronic controllers 20X, 20Y, and 20Z in Step S944 described later.

The initial setting data CDAT may be sequentially transferred to the data memory 205 in a unit of a plurality of bytes through the RAM memory 203 in Step S932b.

In Step S913 subsequent to Step S912b, it is determined whether or not the transmission of the initial setting data CDAT is completed. When the transmission of the initial setting data CDAT is not completed, it is determined as NO and the processing returns to Step S912b. On the other hand, when the transmission is completed, it is determined as YES and the processing proceeds to Step S914.

In Step S914, a program transfer completion signal is transmitted to the electronic controllers 20X, 20Y, and 20Z. Then, the processing proceeds to Step S917 illustrated in FIG. 10.

In Step S934 subsequent to Step S932b, whether or not the completion signal transmitted in Step S914 is received is determined. When the completion signal is not received yet, the processing returns to Step S932b. On the other hand, when the completion signal is received, it is determined as YES and the processing proceeds to Step S935 illustrated in FIG. 10.

In the processing illustrated in FIG. 10, in Step S935, whether or not there is an abnormality in the initial setting data CDAT received in Step S932b is determined by checking with, for example, the code check means as represented by the CRC check. In subsequent Step S936, when there is no abnormality, it is determined as NO and the processing proceeds to Step S940. On the other hand, when there is an abnormality, it is determined as YES and the processing proceeds to Step S937.

In Step S937, an abnormality occurrence notification is returned to the second external tool 10C. Then, the processing proceeds to Step S342. In Step S342, whether or not the power switch 92 is closed is determined. When the power switch 92 is closed, it is determined as YES. Then, the processing proceeds to an operation termination step S330 of the CPU 200. On the other hand, when the power switch 92 is not closed, it is determined as NO. Then, the processing proceeds to Step S943.

In Step S917 subsequent to Step S914, the abnormality occurrence information notified and returned in Step S937 is received to determine whether or not there is an abnormality. When there is an abnormality, it is determined as YES and the processing proceeds to Step S918. When there is no abnormality, it is determined as NO and the processing proceeds to an operation termination step S919.

In Step S918, the occurrence of the abnormality is notified by the display 107. Then, after a re-operation is instructed, the processing proceeds to the operation termination step S919.

In Step S943 subsequent to Step S342, the power switch 92 is opened. When the initial setting data CDAT received in Step S932b is not transferred to and stored in the data memory 205, it is determined as YES and the processing proceeds to Step S944. When the power switch 92 is interrupted again after the transfer and storage is completed, it is determined as NO and the processing proceeds to Step S345.

In Step S944, the initial setting data CDAT received in Step S932b and written in the RAM memory 203 is transferred to a predetermined address in the data memory 205 to be stored.

In Step S345, apart of the initial setting data CDAT is rewritten to a proper value learned and stored during the operation of the electronic controllers 20X, 20Y, and 20Z, and summary values for types of the abnormality information generated during the operation are updated and stored as abnormality occurrence history information.

In Step S346, at the time when the transfer processing to the data memory 205 in Step S944 or S345 is completed, the watchdog signal WDS is stopped.

In Step S347, based on the stop of the watchdog signal WDS, the same watchdog timer 220 as those illustrated in FIGS. 1 and 5 stops the output allowance signal OUTE. As a result, the self-holding circuit 222 stops the self-holding drive output DRV to de-energize the power relay Ry.

In the actual operation state in which the transfer of the initial setting data CDAT is completed and the second external tool 10C is removed, when the control microprocessor 200 starts operating in Step S921a by power ON, the write-mode signal WM is read out in Step S322. After it is determined as NO in Step S324, the total control program TCPRG is started in Step S340. As a result, in Step S341, the input/output control is started. However, when the second external tool 10C is not connected, the processing immediately proceeds from Step S932a to Step S342. In a state in which the power switch 92 is closed, the processing periodically proceeds from Step S342 to the operation termination step S330. Then, the operation start step S921a, Steps S322, S324, S340, S341, S932a, and S342, and the operation termination step S330 are repeatedly executed.

However, when the power switch 92 is opened, it is determined as NO in Step S342. Then, the processing escapes from the circulation loop. After the processing in Steps S944 and S345 is executed, the power relay Ry is de-energized.

Next, the description is given referring to FIGS. 11 and 12. FIG. 11 is a setting table of the initial setting data CDAT of the electronic control apparatus to be connected to the program tool illustrated in FIG. 8, and FIG. 12 is a graph for showing the initial setting data CDAT.

In FIG. 11, DATi=DAT1 to DAT8 shown in the uppermost row indicates the number of eight pieces of initial setting data. The number DATi has a value between a smallest value Ai and a largest value Bi stored as real-number values.

For example, when DAT1 is a value of a detection signal voltage at a reference temperature of 25° C. of a certain temperature sensor and the temperature sensor has an individual variation within an allowable range of the detection voltage from 2.5 V to 2.8 V, A1=2.5 and B1=2.8 are obtained.

As a selected stage number Ji indicated in the left column of FIG. 11, for example, a stage selected from stages 0 to 10 can be set for each data DATi.

If the selected stage number Ji=3 is selected for DAT1, a set value Dij=D13 becomes 2.59 calculated by Expressions (1) and (2).

$$\text{Set value } Dij = Ai + Kij \times (Bi - Ai) \quad (1)$$

$$\text{Selected value } Kij = Ji/Jmax \quad (2)$$

where Ji is a selected stage number for DATi, and Jmax is a maximum stage number.

$$\therefore D13 = 2.5 + (3/10) \times (2.8 - 2.5) = 2.59$$

Therefore, if the detection voltage of the actual component to be used is 2.59 V, the selected stage number J=3 may be selected.

At the time when actual component characteristics of the temperature sensor are unknown, for example, J=5 may be temporarily selected as an intermediate selected stage number. Alternatively, if the selected stage number is preferably set smaller or larger in view of fail-safe, J=0 or J=10 may be temporarily selected.

In FIG. 12, a vertical axis indicates a value of the set value Dij expressed by Expression (1), whereas a horizontal axis indicates the selected stage number Ji for DATi.

Therefore, when the selected stage number Ji=0, the set value Di0=Ai is obtained. When the selected stage number Ji=Jmax=10, the set value Di10=Bi is obtained.

As a typical method of using the setting table shown in FIG. 11, for example, "3, 1, 4, 1, 5, 9, 2, 6" are selected as the selected stage numbers Ji in the order of DAT1 to DAT8. When the numerical sequence is input from the external tool 10C, the set values Dij in the dotted fields shown in FIG. 11 can be set as the initial setting data CDAT.

When Jmax+1 is exceptionally set as the selected stage number Ji, a current condition can be maintained without changing the initial setting data CDAT which is already written and stored.

As a result, only specific initial setting data in the plurality of pieces of initial setting data DATi is easily changed.

As another typical method of using the setting table shown in FIG. 11, for example, the smallest value A2=0 and the largest value B2=Jmax are set as the set values for DAT2, the set value D2j is calculated as follows by Expressions (1) and (2).

$$D2j = A2 + (J2/Jmax) \times (B2 - A2)$$

$$= 0 + (J2/Jmax) \times (Jmax - 0)$$

$$= J2$$

Thus, the set value D2J is the selected stage number J2 itself. The selected stage number J2 can be used as various parameter numbers.

For example, ten data tables are provided to the input/output main control program CPROG in accordance with vehicle types to be used. Which data table number is to be used can be determined by the selected stage number J2.

Alternatively, ten sub-routine programs to be selected are provided to the input/output main control program CPROG in accordance with the vehicle types to be used. Which sub-routine program number is to be used can be determined by the selected stage number J2.

When the initial setting data CDAT described above is changed during the actual operation of the electronic controllers 20X, 20Y, and 20Z, the change can be immediately validated. In view of safety, however, it is more preferred that the electronic controllers 20X, 20Y, and 20Z be stopped once, the initial setting data CDAT be transferred from the RAM memory 203 to the non-volatile data memory 205 to be stored therein, and thereafter new initial setting data be validated at the restart of the operation.

In the description given above, the second external tool 10C is provided to write and rewrite the initial setting data CDAT, and the sub-routine program can also be selected and switched over. When the setting changed by using the second external tool 10C is validated at the restart of the operation of the electronic controllers 20X, 20Y, and 20Z, a simple selection control program using, for example, a specific program language which is open to a user in advance can be written and set as an optional function which can be changed by using the second external tool 10C.

However, the input/output main control program CPROG of the electronic controllers 20X, 20Y, and 20Z can be set so as to be changeable only by the first external tool 10A or 10B used in the electronic controllers 20X, 20Y, and 20Z in view of quality guarantee. In this manner, a free change by the user is restricted.

As described above, the second external tool 10C which is used for a limitative purpose and the first external tool 10A or 10B for multipurpose can be connected to the same communication lines LANH and LANN. Based on the above-mentioned fact, a great advantage is obtained in that the system configuration becomes simple and inexpensive. On the other hand, it becomes important to consider so as not to erroneously set the mode to the write mode to stop the operation of the electronic controllers 20X, 20Y, and 20Z due to an erroneous operation of the second external tool 10C or an erroneous operation caused by noise during the actual operation of the electronic controllers 20X, 20Y, and 20Z or to generate an abnormality in the input/output control program.

In the electronic control apparatus according to the present invention, the write mode can be set only by the first external tool. In addition, even when the serial communication line is used, the electronic control apparatus determines whether or not the mode is the write mode by the comparison circuit for comparing the magnitude of the received signal voltage without depending on the serial communication information. Therefore, the write mode can be reliably set without depending on the operating state of the control microprocessor.

Moreover, the second external tool for writing and rewriting the initial setting data uses the same communication lines as those used by the first external tool and operates by the same transfer control program. Therefore, a capacity of the program memory included in the electronic controller can be reduced to simplify the hardware configuration.

(3) Essential Points and Features of Third Embodiment

As is apparent from the description given above, the "electronic control apparatus to be connected to a program tool" according to the third embodiment of the present invention has the following features in relation with the invention recited in claim 1 of this application.

Similarly to the first and second embodiments, the "electronic control apparatus to be connected to a program tool" 30C according to the third embodiment of the present invention includes: the electronic controllers 20X to 20Z each including the control microprocessor 200 for controlling driving of the electric load 70 externally connected through the output interface circuit 207 in accordance with an operating state of the sensor 60 externally connected through the input interface circuit 206 and a content of the input/output main control program CPROG which is a part of the total control program TCPRG stored in each of the electrically readable and writable non-volatile program memories 204X to 204Z; and the first external tool 10B including: the source memory 104Bn having the total control program TCPRG written therein; and the transfer microprocessor 100 for transferring and writing the total control program TCPRG to the program memories 204X to 204Z, the electronic controllers 20X to 20Z and the first external tool 10B being serially connected to each other. The serial connection uses the local area network (LAN) transceiver 1100 in which the master-station driver 110 and the master-station receiver 111 of the first external tool 10B and the slave-station receiver 211 and the slave-station driver 210 of the electronic controllers 20X to 20Z are connected to each other by the pair of communication lines LANH and LANN.

The pair of communication lines LANH and LANN are each a general-purpose communication line which is serially connectable to at least the second external tool 10C replacing the first external tool 10B.

The control microprocessor 200 further includes: the RAM memory 203 for computation processing; the non-volatile boot program memory 201, which is a part of an area of the program memories 204X to 204Z or is connected after division; and the non-volatile data memory 205 for storing one of a control constant to be variably set and a control constant including a part of a control program, the non-volatile data memory 205 being a part of an area of the program memories 204X to 204Z or being connected after division. The boot program memory 201 stores in advance the transfer control program TPRG for transferring and writing the total control program TCPRG through the LAN transceiver 1100. The first external tool 10B further includes: the control power supply 108 for supplying the control voltage Vcc to the master-station driver 110 and the master-station receiver 111; and the high-voltage power supply 109 for supplying the high voltage Vaa to at least one of the pair of communication lines LANH and LANN in accordance with the switching signal MOD generated by the first external tool 10B before the total control program TCPRG is transferred. The high voltage Vaa is higher than the control voltage Vcc and equal to or lower than a withstanding voltage at which the LAN transceiver 1100 operates normally. When the total control program TCPRG is transferred from the first external tool 10B to be written to the electronic controllers 20X to 20Z, the high voltage Vaa is applied to one of the pair of communication lines LANH and LANN at least until the control microprocessor 200 recognizes the program write mode.

The electronic controllers 20X to 20Z each further include the comparison circuit 212B for determining whether or not the signal voltage transmitted by the communication lines LANH and LANN exceeds at least the control voltage Vcc. When the comparison circuit 212B detects a high voltage exceeding the control voltage Vcc, the write-mode signal WM is generated by the write-mode determination circuit 218B while the control microprocessor 200 is initialized to be restarted by the reset-pulse generation circuit 219, and the restarted control microprocessor 200 recognizes a write mode based on the write-mode signal WM and receives the total control program TCPRG transmitted from the first external tool 10B by referring to the boot program memory 201 to transfer the total control program TCPRG to be stored in the program memories 204X to 204Z or the program memories 204X to 204Z and the data memory 205. The high-voltage power supply 109 is blocked or excluded with respect to the second external tool 10C, and the second external tool 10C writes the control constant to the data memory 205 based on a content of the telecommunication control program TPRGU which is another part of the total control program TCPRG.

Further, the electronic control apparatus according to this embodiment has the following features in relation with the invention recited in claim 12 of this application.

The total control program TCPRG to be transferred and written to the program memories 204X to 204Z of the electronic controllers 20X to 20Z by the first external tool 10B further includes the temporary setting data CDAT0 for the variable control constant associated with the input/output main control program CPROG. The electronic controllers 20X to 20Z are each serially connected to a second external tool 10C through the LAN transceiver 1100. The second external tool 10C includes: the tool control program memory 102C to cooperate with the transfer microprocessor 100; and the source memory 105 which stores the initial setting data CDAT to be used as the control constant, the transfer microprocessor 100 and the control microprocessor 200 cooperating with each other to transfer at least part of the initial setting data CDAT to the data memory 205 by using the telecommunication control program TPRGU. When receiving the initial setting data CDAT transmitted from the second external tool 10C, the electronic controllers 20X to 20Z perform input/output control based on the initial setting data CDAT and the input/output main control program CPROG in place of the temporary setting data CDAT0. The temporary setting data CDAT0 has a predetermined value between an upper limit value and a lower limit value of the variable control constant to be stored as the initial setting data CDAT.

As described above, in relation with the invention recited in claim 12 of the present invention, in the first external tool, the total control program TCPRG containing the input/output main control program CPROG, the temporary setting data CDAT0, and the telecommunication control program TPRGU for the second external tool is transferred and written to the program memory of the electronic controller. In the second external tool, only the initial setting data CDAT which replaces the temporary setting data CDAT0 which is a part of the input/output main control program CPROG is transferred and written to the data memory of the electronic controller.

Therefore, the present invention has the following feature. The first external tool is suitable for use in the shipping adjustment line of the manufacturer of the electronic control apparatus, whereas the second external tool is suitable for use in an assembly manufacturer or a maintenance and inspection service department of the manufacturer of the electronic control apparatus. Therefore, the first external tool and the second external tool which are configured to have approximately the same hardware can be respectively used for different purposes.

Moreover, the present invention has the following feature. The second external tool does not include a high-voltage power supply for applying the high voltage Vaa to the communication lines LANH and LANN. Therefore, the electronic controller is not erroneously set in the program write mode, and the total control program TCPRG is not carelessly rewritten to be changed. Therefore, the reliability of the total control program TCPRG is improved.

The same is applied to the electronic control apparatus described in the first and second embodiments.

Further, the electronic control apparatus according to this embodiment has the following features in relation with the invention recited in claim 13 of this application.

The initial setting data CDAT to be transferred from the second external tool 10C to the data memory 205 is temporarily transferred to the RAM memory 203 provided to the electronic controllers 20X to 20Z. The electronic controllers 20X to 20Z are fed with power through the output elements 91a, 91b, and 91c of the power relay, the power relay being interrupted after a predetermined delay power-feeding time period after a power switch which is an operation switch is opened. The initial setting data CDAT written in the RAM memory 203 is transferred and written to the non-volatile data memory 205 during the predetermined delay power-feeding time period in which the power switch is interrupted to stop a drive output to the electric load.

As described above, in relation with the invention recited in claim 13 of the present invention, the initial setting data CDAT transferred from the second external tool to be written is temporarily written in the RAM memory of the electronic controller. At the time when the electronic controller stops operating, the initial setting data CDAT is transferred to the non-volatile data memory.

Therefore, the present invention has a feature in that time required for writing to the non-volatile data memory does is not affected and thus high-speed communication is enabled between the second external tool and the electronic controller. As a result, the occurrence of a communication error can be prevented during the transmission of the initial setting data.

In addition, the electronic control apparatus has the following feature. Specifically, the initial setting data CDAT written in the RAM memory is not immediately validated. Instead, the initial setting data CDAT stored in the program memory is validated after the restart of the operation after the temporary stop of the operation. As a result, an accident due to runaway of the microprocessor can be avoided.

In this case, a specific modified control program provided by the manufacturer of the electronic control apparatus or the application program based on the predetermined program language opened to the user can be transmitted to the electronic control apparatus by using the second external tool. In this manner, apart of the control specifications of the electronic control apparatus can be changed by the user.

The same is applied to the electronic control apparatus described in the first and second embodiments.

Further, the electronic control apparatus according to this embodiment has the following features in relation with the invention recited in claim 14 of this application.

A plurality of the electronic controllers 20X, 20Y, and 20Z are mutually connected to the LAN transceiver by the pair of communication lines LANH and LANN, and the first external tool 10B is removed in an actual operation state and one of an assembly adjustment operation state and a maintenance and check adjustment operation state in which the sensor and the electric load to be used are connected to each of the plurality of electronic controllers 20X, 20Y, and 20Z to apply the drive voltage Vbb. At least one of the plurality of electronic controllers 20X, 20Y, and 20Z is sequentially serially connected to the communication lines LANH and LANN of the LAN transceiver so as to mutually perform a cooperative operation. The second external tool 10C is connected to the electronic controllers 20X, 20Y, and 20Z in operation through the communication lines LANH and LANN. The tool control program memory 102C provided to the second external tool 10C contains machine-type code information corresponding to the plurality of electronic controllers 20X, 20Y, and 20Z and transmits the initial setting data CDAT to any one of the plurality of electronic controllers 20X, 20Y, and 20Z which is specified by the second external tool 10C.

As described above, in relation with the invention recited in claim 14 of the present invention, when the electronic controller is operated, the first external tool is removed so that another electronic controller can be connected to the LAN transceiver. At the same time, when the initial setting data CDAT is desired to be written, the second external tool can be connected.

Therefore, the present invention has a feature in that the serial communication lines provided to connect the first external tool are directly used to enable a cooperative operation of the plurality of electronic controllers.

Moreover, the second external tool is used in common among various electronic controllers such as the engine controller, the transmission controller, and the brake controller, which are the in-vehicle electronic controllers.

The common use of the second external tool can be readily achieved by the intercommunication between the second external tool and the various electronic controllers with the use of the general-purpose LAN protocol.

The same is applied to the electronic control apparatus described in the first and second embodiments.

Further, the electronic control apparatus according to this embodiment has the following features in relation with the invention recited in claim 15 of this application.

The temporary setting data CDAT0 to be stored in a part of an area of the program memories 204X, 204Y, and 204Z provided in the electronic controllers 20X, 20Y, and 20Z contains real-number values of a smallest value Ai and a largest value Bi corresponding to a data number i=1, 2, 3 to m and contains a temporary selected value K1j, K2j, K3j to Kmj which is obtained by temporarily selecting a selected value Kij=Ji/Jmax for each set data, the selected value Kij=Ji/Jmax being a ratio of a selected stage number Ji when a deviation between the smallest value Ai and the largest value Bi is divided by a largest stage number Jmax. The initial setting data CDAT set by one of the first external tool 10A or 10B and the second external tool 10C has a determined selected value K1j, K2j, K3j to Kmj which is newly selected and determined for each data in accordance with one of the sensor and the electric load to be used. A real-number value DATi which is a set value Dij of one of the temporary setting data CDAT0 and the initial setting data CDAT relating to the data number i is calculated by Expressions (1) and (2), $$DATi = Dij = Ai + Kij \times (Bi - Ai) \quad (1)$$

$$\text{where } Kij = Ji/Jmax \quad (2).$$

The temporary selected value and the determined selected value Kij are numerical-value data of predetermined bits or smaller, which is smaller than the real-number value of the initial setting data.

As described above, in relation with the invention recited in claim 15 of the present invention, in the numerical value setting area of the program memory included in the electronic controller, the smallest value Ai and the largest value Bi for each of the plurality of pieces of setting data and the selected value Kij for specifying the set value Dij between the smallest value Ai and the largest value Bi are specified. In comparison with the temporary selected value Kij in the temporary setting data CDAT0, the determined selected value Kij in the initial setting data CDAT is a selected value corrected in accordance with the characteristics of the sensor and the electric load to be used.

Therefore, the present invention has the following feature. The initial setting data CDAT written and set to the electronic controller after the shipping of the electronic control apparatus is set by a numerical-value level, for example, in four bits at levels or lower. Therefore, the number of digits of the transferred numerical value is remarkably reduced as compared with the setting with a real-number value. Therefore, handling performance is improved.

Moreover, the present invention has a feature in that the smallest value and the largest value are written and stored for each of the setting data and hence the occurrence of an abnormality is determined when the initial setting data to be actually used is out of the range between the smallest value and the largest value.

The same is applied to the electronic control apparatus described in the first and second embodiments.

Further, the electronic control apparatus according to this embodiment has the following features in relation with the invention recited in claim 16 of this application.

For any number p of the data number i=1 to m contained in the temporary setting data CDAT0, a smallest value Ap is set to 0 and a largest value Bp is set to the largest stage number Jmax, and a real-number value DATp of one of the temporary setting data CDAT0 and the initial setting data CDAT is calculated based on Expression (1) as:

$$DATp = Ap + Kpj \times (Bp - Ap) = 0 + (Jp/Jmax) \times (Jmax - 0) = Jp$$

to obtain the selected stage number Jp.

As described above, in relation to claim 16 of the present invention, by setting 0 as the smallest value Ap and setting the largest value Bp as the largest stage number Jmax for the data number p, the selected stage number Jp is obtained as the real-number value DATp of the set value.

Therefore, the selected stage number Jp which is a variably selectable integer value is used as a variable parameter. Therefore, when, for example, any one of the ten data tables provided in the program memory is desired to be selected for use, the table number only needs to be specified as the parameter.

Moreover, in the electronic control apparatus having a plurality of purposes of use (for example, a plurality of kinds of vehicles in which the electronic control apparatus is used), the sub-routine programs corresponding to the respective purposes of use are prepared in advance as a part of the input/output control program. By selecting and setting the sub-routine program to be used by using the parameter number, the part of the input/output control program can be changed in accordance with the purpose of use.

The same is applied to the electronic control apparatus described in the first and second embodiments.

In the description given above, the term "predetermined" as used in the predetermined value, the predetermined set value, the predetermined duration time, the predetermined cycle, the predetermined time period, the predetermined number of times, the predetermined output voltage, the predetermined delay power-feeding time period, and the predetermined number of bits means a "fixed set control constant determined in advance by the manufacturer to be stored in the program memory, a circuit constant such as a voltage-division ratio of the voltage dividing circuit or a comparison reference voltage, or a variable constant calculated based on a specific mathematic expression which is determined in advance and stored in the program memory". Therefore, the term "predetermined" does not only means a constant and invariable fixed constant.

What is claimed is:

1. An electronic controller capable of connecting with various external tools, wherein:
   the various external tools include at least a first external tool and a second external tool,
   the electronic controller comprises a control microprocessor for controlling driving of an electric load externally connected through an output interface circuit in accordance with an operating state of a sensor externally connected through an input interface circuit and a content of an input/output main control program CPROG which is a part of a total control program TCPRG stored in an electrically readable and writable non-volatile program memory; and the first external tool comprises:
- a source memory that stores the total control program TCPRG; and
- a transfer microprocessor for transferring the total control program TCPRG from the source memory to the control microprocessor and causing the total control program TCPRG to be written in the program memory of the control microprocessor;

the electronic controller is serially connected to the first external tool via a local area network (LAN) transceiver in which a master-station driver and a master-station receiver of the first external tool and a slave-station receiver and a slave-station driver of the electronic controller are connected to each other by a pair of communication lines LANH, LANN;

each of the communication lines LANH, LANN is a general-purpose communication line which is serially connectable to at least a second external tool replacing the first external tool;

the control microprocessor further comprises:
- a random access memory (RAM) for computation processing;
- a non-volatile boot program memory that comprises a read only memory (ROM) and stores a transfer control program TPRG to transfer the total control program TCPRG from the first external tool to the control microprocessor through the LAN transceiver and to write the total control program TCPRG in the program memory; and
- an electrically readable and writable non-volatile data memory for storing at least one setting-changeable control parameter;

the boot program memory and the data memory each capable of using a part of area of the program memory, the first external tool further comprises:
- a control power supply for supplying a control voltage Vcc to the master-station driver and the master-station receiver of the first external tool; and
- a high-voltage power supply for supplying a high voltage Vaa to at least one of the pair of communication lines LANH, LANN before the first external tool starts to transfer the total control program TCPRG at least until the control microprocessor recognizes a program write mode, in response to receiving a switching signal MOD generated by the transfer microprocessor to turn on the program write mode in which the total control program TCPRG is transferred from the first external tool to the electronic controller to be written in the program memory of the electronic controller, the high voltage Vaa being higher than the control voltage Vcc and equal to or lower than a withstanding voltage at which the LAN transceiver operates normally;

the electronic controller further comprises:
- a comparison circuit that determines whether or not a signal voltage transmitted by the communication lines LANH, LANN exceeds at least the control voltage Vcc; and
- a write-mode determination circuit that generates a write-mode signal WM while the control microprocessor is restarted, in response to the comparison circuit determining that the signal voltage exceeds the control voltage Vcc;

the restarted control microprocessor recognizes the program write mode based on the write-mode signal WM, receives the total control program TCPRG transmitted from the first external tool, and stores the total control program TCPRG in the program memory of the control microprocessor.

2. The electronic controller according to claim 1, wherein:
the total control program TCPRG to be transferred and written to the program memory of the electronic controller by the first external tool further comprises temporary setting data CDAT0 for the control parameter associated with the input/output main control program CPROG;

the first external tool comprises the source memory which stores initial setting data CDAT to be used as the control parameter, and the transfer microprocessor and the control microprocessor cooperate with each other to transfer at least part of the initial setting data CDAT to the data memory by using a telecommunication control program TPRGU;

the electronic controller performs input/output control based on the initial setting data CDAT and the input/output main control program CPROG when the initial setting data CDAT is stored in the data memory, and performs the input/output control based on the temporary setting data CDAT0 and the input/output main control program CPROG when the initial setting data CDAT is not stored in the data memory; and the temporary setting data CDAT0 has a predetermined value between an upper limit value and a lower limit value of the variable control parameter to be stored as the initial setting data CDAT.

3. The electronic controller according to claim 1, wherein:
one of the boot program memory and the program memory of the electronic controller stores machine-type code information;

the first external tool further comprises a tool control program memory to cooperate with the transfer microprocessor;

the tool control program memory contains a tool control program comprising a principal control program irrelevant to a machine type of the electronic controller to be applied and an individual control program corresponding to the machine type;

the transfer microprocessor executes the principal control program and the individual control program corresponding to the machine type based on the machine-type code information transmitted from the electronic controller; and the first external tool is applied to write the total control program TCPRG to a plurality of types of the electronic controllers.

4. The electronic controller according to claim 1, wherein:
the master-station driver and the slave-station driver are brought into a dominant mode in which a logic level of the communication line LANH is "H" and a logic level of the communication line LANN is "L" in a case of a dominant logic in which a transmission logic signal TXD is at a logic level of one of "L" and "H";

the master-station driver and the slave-station driver are brought into a recessive mode in which the logic levels of both the communication lines LANH, LANN are in a floating state at an intermediate potential of a power-supply voltage in a case of a recessive logic in which the transmission logic signal TXD is at an inverted logic level of another of "H" and "L";

the high voltage Vaa is directly applied to the communication line LANH through a high-voltage power switch including a backflow prevention diode from the high-voltage power supply when the switching signal MOD is generated, and the transmission logic signal TXD for the master-station driver and the slave-station driver is set to one of the recessive logic and the dominant logic, or the high voltage Vaa is directly applied to the communication line LANN through the high-voltage power switch including the backflow prevention diode from the high-voltage power supply when the switching signal MOD is generated, and the transmission logic signal TXD for the master-station driver and the slave-station driver is set to the recessive logic; and the comparison circuit monitors a signal voltage of one of the communication lines LANH, LANN to which the high voltage Vaa is applied.

5. The electronic controller according to claim 1, wherein:
the master-station driver and the slave-station driver are brought into a dominant mode in which a logic level of the communication line LANH is "H" and a logic level of the communication line LANN is "L" in a case of a dominant logic in which a transmission logic signal TXD is at a logic level of one of "L" and "H";

the master-station driver and the slave-station driver are brought into a recessive mode in which the logic levels of both the communication lines LANH, LANN are in a floating state at an intermediate potential of a power-supply voltage in a case of a recessive logic in which the transmission logic signal TXD is at an inverted logic level of another of "H" and "L";

when the switching signal MOD is generated to notify the write mode, the high voltage Vaa is applied as a power-supply voltage of the master-station driver through a high-voltage power switch, whereas when the write mode is cancelled, the power-supply voltage of the master-station driver is connected again to the control voltage Vcc, and the transmission logic signal TXD of the master-station driver is set to the dominant logic during a write-mode time period, whereas the transmission logic signal TXD of the slave-station driver is settable to any one of the recessive logic and the dominant logic, which results in the logic level of the communication line LANH set to "H" and the logic level of the communication line LANN set to "L"; and the comparison circuit monitors one of a signal voltage of the communication line LANH, which is generated by the high voltage Vaa, and a differential voltage between signal voltages of the communication lines LANH, LANN.

6. The electronic controller according to claim 1, wherein:
in a state in which the first external tool and the electronic controller are serially connected, when the program write mode is set by an operation key of the first external tool, the transfer microprocessor generates the switching signal MOD to perform switching connection so that the signal voltage to be applied to one of the communication lines LANH, LANN becomes the high voltage Vaa during a predetermined set time period;

the predetermined set time period is set equal to or longer than a time period required for the electronic controller to recognize the program write mode by the comparison circuit to initialize and restart the control microprocessor; and the electronic controller starts transmitting and receiving serial signal information when the comparison circuit for determining a received signal voltage level determines that the signal voltage is based on the control voltage Vcc.

7. The electronic controller according to claim 1, wherein:
the comparison circuit generates a determination logic signal CMP in accordance with reception of the high voltage Vaa, and the write-mode determination circuit generates the write-mode signal (WM) based on generation of the determination logic signal CMP over a predetermined duration time period or longer, and the predetermined duration time period is equal to or longer than a time period required for the LAN transceiver to transmit data of one frame.

8. The electronic controller according to claim 1, wherein:
the first external tool intermittently applies the switching signal MOD in a predetermined cycle; and the electronic controller generates a determination logic signal CMP which performs an inverse operation in accordance with an intermittent operation of the high voltage Vaa by the comparison circuit, and the write-mode determination circuit generates the write-mode signal WM when the determination logic signal CMP is generated for a predetermined number of times within a predetermined time period.

9. The electronic controller according to claim 1, wherein:
the high voltage Vaa which is an output voltage of the high-voltage power supply provided in the first external tool is higher than a direct current (DC) drive voltage Vbb for feeding power to drive the electronic controller; and the control microprocessor, and the slave-station driver and the slave-station receiver are fed with power by a predetermined stabilizing power supply obtained by lowering the DC drive voltage Vbb.

10. The electronic controller according to claim 1, wherein:
the comparison circuit compares a first input signal voltage obtained by reducing the signal voltage of one of the communication lines LANH, LANN applied with the high voltage Vaa by voltage-dividing resistors and a second input signal voltage which is a predetermined output voltage output by a reference voltage source, and generates a determination logic signal CMP corresponding to the program write mode when the signal voltage of the one of the communication lines LANH, LANN exceeds the control voltage Vcc; and a power-supply voltage of the comparison circuit comprises the control voltage Vcc generated by the control power supply provided to the electronic controller.

11. The electronic controller according to claim 1, wherein:
the comparison circuit compares a first input signal voltage obtained by reducing the signal voltage of one of the communication lines LANH, LANN applied with the high voltage Vaa by voltage-dividing resistors and a second input signal voltage and a third input signal voltage which are predetermined output voltages output by a reference voltage source, and generates a determination logic signal CMP corresponding to the program write mode when the signal voltage of the one of the communication lines LANH, LANN is within a predetermined voltage band exceeding the control voltage Vcc; and a power-supply voltage of the comparison circuit comprises the control voltage Vcc generated by the control power supply provided to the electronic controller.

12. The electronic controller according to claim 1, wherein:
the total control program TCPRG to be transferred and written to the program memory of the electronic controller by the first external tool further comprises temporary setting data CDAT0 for the control parameter associated with the input/output main control program CPROG;

the electronic controller is serially connected to a second external tool through the LAN transceiver;

the second external tool comprises:
- a tool control program memory to cooperate with the transfer microprocessor; and
- a source memory which stores initial setting data CDAT to be used as the control parameter,
- the transfer microprocessor and the control microprocessor cooperating with each other to transfer at least part of the initial setting data CDAT to the data memory by using a telecommunication control program TPRGU;

when receiving the initial setting data CDAT transmitted from the second external tool, the electronic controller performs input/output control based on the initial setting data CDAT and the input/output main control program CPROG in place of the temporary setting data CDAT0; and the temporary setting data CDAT0 has a predetermined value between an upper limit value and a lower limit value of the control parameter to be stored as the initial setting data CDAT.

13. The electronic controller according to claim 12, wherein:

the initial setting data CDAT to be transferred from the second external tool to the data memory is temporarily transferred to the RAM memory provided to the electronic controller;

the electronic controller is fed with power through an output element of a power relay, the power relay being interrupted after a predetermined delay power-feeding time period after a power switch which is an operation switch is opened; and the initial setting data CDAT written in the RAM memory is transferred and written to the non-volatile data memory during the predetermined delay power-feeding time period in which the power switch is interrupted to stop a drive output to the electric load.

14. The electronic controller according to claim 12, wherein:

a plurality of the electronic controllers are mutually connected to the LAN transceiver by the pair of communication lines LANH, LANN, and the first external tool is removed in an actual operation state and one of an assembly adjustment operation state and a maintenance and check adjustment operation state in which a sensor and an electric load to be used are connected to each of the plurality of electronic controllers to apply the drive voltage Vbb;

at least one of the plurality of electronic controllers is sequentially serially connected to the communication lines LANH, LANN of the LAN transceiver so as to mutually perform a cooperative operation;

the second external tool is connected to the electronic controller in operation through the communication lines LANH, LANN; and the tool control program memory provided to the second external tool contains machine-type code information corresponding to the plurality of electronic controllers and transmits the initial setting data CDAT to any one of the plurality of electronic controllers which is specified by the second external tool.

15. The electronic controller according to claim 12, wherein:

the temporary setting data CDAT0 to be stored in a part of an area of the program memory provided in the electronic controller contains real-number values of a smallest value Ai and a largest value Bi corresponding to a data number i=1, 2, 3 to m and contains a temporary selected value K1j, K2j, K3j to Kmj which is obtained by temporarily selecting a selected value Kij=Ji/Jmax for each set data, the selected value Kij=Ji/Jmax being a ratio of a selected stage number Ji when a deviation between the smallest value Ai and the largest value Bi is divided by a largest stage number Jmax;

the initial setting data CDAT set by the first external tool and the second external tool has a determined selected value K1j, K2j, K3j to Kmj which is newly selected and determined for each data in accordance with one of the sensor and the electric load to be used;

a real-number value DATi which is a set value Dij of one of the temporary setting data CDAT0, and the initial setting data CDAT relating to the data number i is calculated by the following equations:

$$DATi = Dij = Ai + Kij \times (Bi - Ai)$$

and $$Kij = Ji/Jmax,$$

wherein the temporary selected value and the determined selected value Kij are numerical-value data of predetermined bits or smaller, which is smaller than the real-number value of the initial setting data.

16. The electronic controller according to claim 15, wherein, for any number p of the data number i=1 to m contained in the temporary setting data CDAT0, a smallest value Ap is set to 0 and a largest value Bp is set to the largest stage number Jmax, and a real-number value DATp of one of the temporary setting data CDAT0 and the initial setting data CDAT is calculated to obtain the selected stage number Jp based on the following equation:

$$DATp = Ap + Kpj \times (Bp - Ap)$$
$$= 0 + (Jp/Jmax) \times (Jmax - 0)$$
$$= Jp.$$

* * * * *